(12) United States Patent
Baum

(10) Patent No.: US 7,640,221 B2
(45) Date of Patent: Dec. 29, 2009

(54) PLAN AND CANDIDATE PLAN BASED SYSTEM FOR ACHIEVING ONE OR MORE GOALS AND SUB-GOALS

(76) Inventor: Eric Baum, 41 Allison Rd., Princeton, NJ (US) 08540

( * ) Notice: Subject to any disclaimer, the term of this patent is extended or adjusted under 35 U.S.C. 154(b) by 468 days.

(21) Appl. No.: 11/403,487

(22) Filed: Apr. 13, 2006

(65) Prior Publication Data

US 2007/0016541 A1    Jan. 18, 2007

Related U.S. Application Data

(60) Provisional application No. 60/671,660, filed on Apr. 15, 2005.

(51) Int. Cl.
*G06N 5/00* (2006.01)
*G06N 5/02* (2006.01)

(52) U.S. Cl. .............. 706/46; 706/47; 706/45
(58) Field of Classification Search ............... None
See application file for complete search history.

(56) References Cited

U.S. PATENT DOCUMENTS

| | | | |
|---|---|---|---|
| 4,935,877 A | 6/1990 | Koza | |
| 5,136,686 A | 8/1992 | Koza | |
| 5,148,513 A | 9/1992 | Koza et al. | |
| 5,343,554 A | 8/1994 | Koza et al. | |
| 5,390,282 A | 2/1995 | Koza et al. | |
| 5,485,601 A | 1/1996 | Ching | |
| 5,742,738 A | 4/1998 | Koza et al. | |
| 5,790,760 A | 8/1998 | Arima et al. | |
| 5,867,397 A | 2/1999 | Koza et al. | |
| 5,870,303 A * | 2/1999 | Trovato et al. | 700/61 |
| 6,058,385 A | 5/2000 | Koza et al. | |
| 6,360,191 B1 | 3/2002 | Koza et al. | |
| 6,424,959 B1 | 7/2002 | Bennett, III et al. | |
| 6,532,453 B1 | 3/2003 | Koza et al. | |
| 6,564,194 B1 | 5/2003 | Koza et al. | |
| 6,658,645 B1 | 12/2003 | Akuta et al. | |
| 2004/0158355 A1 * | 8/2004 | Holmqvist et al. | 700/245 |

OTHER PUBLICATIONS

Jonsson et al., Ari, "Planning in Inteplanetary Space: Theory and Practice", 2000.*

(Continued)

*Primary Examiner*—David R Vincent
*Assistant Examiner*—Adrian L Kennedy
(74) *Attorney, Agent, or Firm*—Lerner, David, Littenberg, Krumholz & Mentlik, LLP

(57) ABSTRACT

A system for achieving a desired goal in a domain. The system may comprise a device operable to receive information and simulate the domain therefrom; a device operable to simulate one or more effects due to one or more operators; a device operable to specify a number of items and/or classes of items and whether each item and/or each class of items is an affectable obstacle or a non-affectable obstacle; a device operable to automatically generate a candidate plan to achieve the desired goal by utilizing the simulated domain and the simulated effect(s), wherein the candidate plan could involve one or more affectable obstacles but does not involve any non-affectable obstacles; and a device operable to automatically refine the candidate plan to change at least one of the affectable obstacles involved in the candidate plan.

21 Claims, 13 Drawing Sheets

OTHER PUBLICATIONS

Eric B. Baum, A Bradford Book, The MIT Press, Cambridge, MA, London, England, "What is Thought?", 2004 MIT, pp. 215-269.

Eric B. Baum et al., "What Size Net Gives Valid Generalization?" MIT Press 1989, pp. 81-90.

Eric B. Baum et al., NEC Research Institute, Evolution of Cooperative Problem-Solving In An Artificial Economy Feb. 28, 2000, pp. 1-24.

Jurgen Schmidhuber, et al. IDSIA, galleria 2, 6928 Manno-Lugano, Switzerland "Bias-Optimal Incremental Learning Of Control Sequences For Virtual Robots".

Eric B. Baum, et al., NEC Research Institue, "An Evolutionary Post Production System" pp. 1-8.

Eric B. Baum, NEC Research Institute, "Manifesto For An Evoultionary Economics Of Intelligence" (1 page).

Jurgen Schmidhuber, Machine Learning, 54, 211-254, 2004, "Optimal Ordered Problem Solver" 2004 Kluwer Academic Publishers, Manufactured in The Netherlands.

Jurgen Schmidhuber, "Optimal Ordered Problem Solver", Technical Support IDSIA-12-02, Version 2.0, Dec. 23, 2002, pp. 1-43.

Juregen Schmidhuber, Advances in Neural Information Processing Systems 15, NIPS'15, MIT Press, Cambridge MA, 2003, in press. "Bias-Optimqal Incremental Problem Solving" (9 pages).

Nilsson, "Artificial Intelligence: A New Synthesis," 1998, pp. 62-63.

Dongkyu Choi and Pat Langley, "Learning Teleoreactive Logic Programs from Problem Solving", vol. 3625/2005, pp. 51-68.

Eric B. Baum, "Toward a Model of Intelligence as an Economy of Agents", Machine Learning, 35:155-185 (1999).

Valiant, "A Neuroidal Architecture for Cognitive Computation", Journal of the ACM, 47(5): 854-882 Sep. 2000.

Valiant, "Robust Logcs", Artificial Intelligence 117; 231-253 (2000).

Eric B. Baum, "Focused Web Crawling using an Auction-based Economy", ACM Journal Name, V(N):1-22 Oct. 2002.

Andreas Junghanns and Jonathan Schaeffer, "Sokoban: A Case-Study in the Application of Domain Knowledge in General Search Enhancements to Increase Efficiency in Single-Agent Search", 1-37.

Stuart Russell and Peter Norvig, "Artificial Intelligence: A Modern Approach", Prentice Hall of India, pp. 375-461 (2007).

Eric B. Baum, NEC Research Institute, "Manifesto For An Evoultionary Economics Of Intelligence" pp. 1-60.

Nau et al. "SHOP2: An HTN Planning System", J. of AI Research 20, 2003, pp. 379-404.

Munoz-Avila et al., "SiN: Integrating Case-based Reasoning with Task Decompositon", Seventeenth International Joint Conference on Artificial Intelligence, Seattle, Aug. 2001, 7 pages.

Office Action from U.S. Appl. No. 12/231,160, mailed Sep. 15, 2009.

* cited by examiner

PLAN AND CANDIDATE PLAN BASED SYSTEM FOR ACHIEVING ONE OR MORE GOALS AND SUB-GOALS

CROSS-REFERENCE TO RELATED APPLICATIONS

This application claims the benefit of the filing date of U.S. Provisional Patent Application No. 60/671,660 filed Apr. 15, 2005, the disclosure of which is hereby incorporated herein by reference.

BACKGROUND OF THE INVENTION

The present invention relates to a method and system for utilizing computers to discover plans that achieve design goals or sets of design goals in domains.

Applications for systems may include programs that schedule work in factories or plants, that control complex systems such as factories or power plants to maintain design criteria, that plan routing for fleets of trucks, that find plans how to economically and rapidly travel to a desired destination, or that play games and solve puzzles. Such applications typically involve a particular given domain. For example, if one were designing a program to play chess, the domain would be chess, or if one were controlling a factory, the domain would be that particular factory, including the particular layout of the particular machines therein. Aspects of the domain may be represented in a computer program or in data readable by a computer program, so that a computer program can be used to construct plans or to aid humans to construct plans to achieve a variety of goals within the domain. For example, one might want the program to be able to win from a variety of different chess positions, or one might want the program to control a factory to optimally produce a variety of different products, with the particular design goal (say whether to produce 100,000 pencils or 50,000 pens and 10,000 pencils) changing in different runs of the program.

Present day automated systems for finding plans may utilize either search or planners. Both of these methods are typically based on domain independent algorithms, and exploit little of the structure of a particular domain. Search programs typically only have knowledge about their goal in the form of an operator that recognizes when it has been achieved, and a heuristic function that may indicate distance from the goal. Planners typically exploit knowledge encoded in what is called the STRIPS language, but this also may fail to exploit useful structure of particular domains. As a result, these methods often search through many possible sequences of operators that are not relevant to solving specific obstacles, and thus are often not efficient enough to solve problems that one wishes to solve in a reasonable amount of time.

However, many domains of interest have structure which might be efficiently exploited for solution. For example, many problems of interest involve routing in two or three dimensions, so that aspects of the topology of two and three dimensions might be exploited in finding plans. Many domains of interest contain objects that may be affected in ways characteristic of the type of object, and which may sometimes present obstacles to plans. Many domains of interest contain characteristic kinds of obstacles to implementing available actions, and these obstacles may in many cases be fixed by solutions characteristic of the kind of obstacle.

SUMMARY OF THE INVENTION

In accordance with an aspect of the present invention, a system for achieving a desired goal in a domain, in which the domain has one or more operators associated therewith, is provided. The system may comprise a device operable to receive information pertaining to the domain and simulate the domain therefrom; a device operable to simulate one or more effects due to the one or more operators associated with the domain; a device operable to specify a number of items and/or a number of classes of items in the domain and whether each item and/or each class of items is an affectable obstacle wherein at least one of the one or more operators can cause a change thereto or a non-affectable obstacle wherein the one or more operators can not cause a change thereto; a device operable to automatically generate a candidate plan to achieve the desired goal by utilizing the simulated domain and the simulated effect(s), wherein the candidate plan could involve one or more affectable obstacles but does not involve any non-affectable obstacles; and a device operable to automatically refine the candidate plan to change at least one of the affectable obstacles involved in the candidate plan.

The present invention may be accomplished by a structured program (or a device that would function similarly to the operation of such a program). The program may comprise (or call as executable modules) a number of domain specific elements including one or more domain simulators, one or more operators representing actions that may be taken, a number of methods for recognizing a domain state wherein an operator is immediately applicable, a number of methods for recognizing a domain state wherein an operator might be applied if one or more affectable obstacles were fixed, and a number of methods of fixing obstacles that obstruct operators. The program may first use a provided means to find a candidate plan or plans, and then may refine such plan or plans. A candidate plan may comprise a sequence of subgoals, typically of applying operators, wherein the program proposes that if those operators may be applied in that sequence, a goal state will result. One means of finding candidate plans is to employ a search technique wherein enabled operators are applied at previously reached states in simulation until a goal state is reached, wherein an operator is enabled in a state if a method recognizes either that it is applicable in that state, or that it might be applicable in that state if affectable obstacles were fixed, changed, or overcome. Means of refining candidate plans may comprise an ordering system to process candidate plans iteratively in an optimized order (typically best first, where best may be measured by an accounting procedure that estimates the cost of the plan) and a means of resolving obstacles. Plans are typically processed in sequential order so that as the next unresolved element is being processed, the state of the domain is available in simulation (because all earlier operations have been resolved) so that relevant objects and operations may be recognized within the simulation. A means of resolving obstacles may be embodied in the following procedure. If a specific method is supplied for dealing with an obstacle, said method may be invoked. Otherwise a default method may be applied which may comprise a search in which operators are applied that affect the obstacle. If it is proposed to apply an operator to affect an obstacle and there are obstacles to applying that operator, the same approach may first be applied to solve those obstacles.

The present invention may provide a technique of achieving design goals in domains, which may be tailored to the structure of the domain, and thus may be much faster and able to address more complex problems as compared to current techniques.

The present invention may provide a technique of exploiting the particular structure of a domain or domains so that only a relevant operator or operators will be considered in searches.

The present invention may provide a technique that may exploit the structure of a planning problem or problems in two or three dimensions.

This process may be highly efficient because (a) it may invoke methods specific to the domain for solving problems, (b) it may find candidate plans efficiently by ignoring obstacles that may later be corrected, and (c) it may only consider relevant operators, that is operators may only be considered in the refinement process if (a) they refine a candidate plan that has been proposed by the mechanism, thus implying reason to believe it may succeed and (b) they are relevant to fixing an obstacle to that candidate plan.

Other improvements are also described, including a means for utilizing a module that detects localized configurations that prevent achievement of a goal state in order to refine and rule out candidate plans; a means for recognizing when previously affected objects are obstacles to a candidate plan and automatically suggesting an alternative candidate plan that may avoid this problem; and a means for finding and using constraints on the order in which goals are solved, for circumstances where multiple goals are presented.

DESCRIPTION OF THE FIGURES

A more complete appreciation of the subject matter of the present invention and the various advantages thereof can be realized by reference to the following detailed description in which reference is made to the accompanying drawings wherein like reference numbers or characters refer to similar elements.

DETAILED EMBODIMENTS

Figure 1:
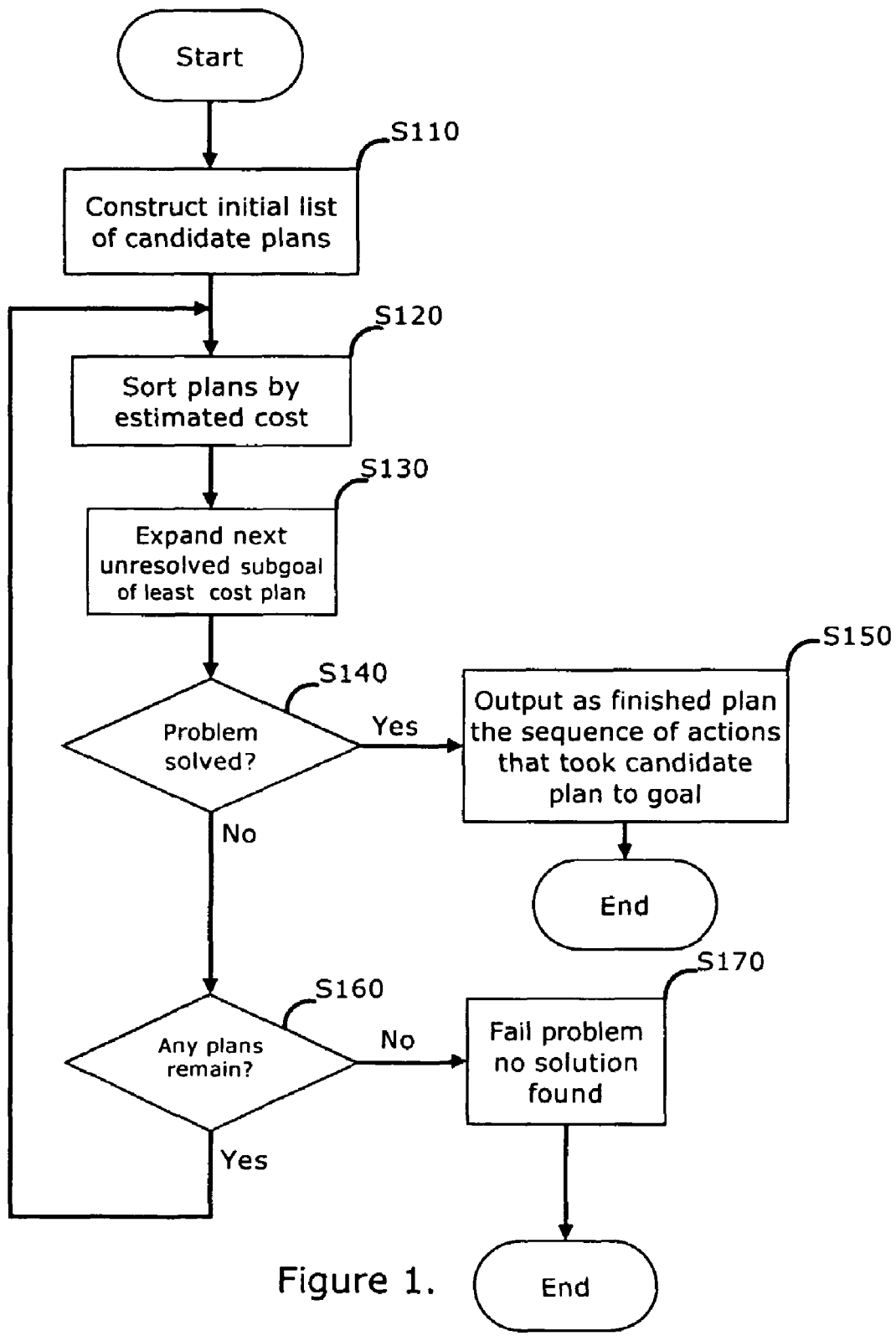
FIG. 1 is a diagram of a flow chart of a planner in accordance with an embodiment of the present invention.

The present invention may be embodied in a computer program for use with a computer or, alternatively, may be embodied in a device that would function equivalently to the execution of such a computer program. In either situation, the present invention may, given a description of a goal or goals to be achieved in a domain, automatically output a sequence of actions to be taken to achieve the goal, or report failure.

Such program or device may alternatively be referred to herein as "the program" or "the planner". The program may be provided with (typically as a callable module) one or more simulations of the domain. Simulations may act at various levels of detail, or simulate various aspects of the domain, potentially ignoring other aspects. The domain may include various kinds of objects and various kinds of goals and also various kinds of actions within the domain may be available. The program may be provided with code that recognizes which actions are available at a given domain state, and that simulates effects of these actions on the domain, such as effects on objects in the domain. Actions made available to the planner may include macro-actions, that is, executable code that implements a number of calculations and actions, which may be referred to herein as "operators". Operators may be associated with executable code that recognizes when the operator may be applied in the domain simulation and implements the effects of the associated action in simulation. The program may also be provided with executable code that may recognize objects or classes of objects within the domain that may under some circumstances be affectable, changeable, or fixable by the available actions, and that may recognize objects or classes of objects that are not affectable, changeable, or fixable. Executable code (within or called by the program) may further identify an operator or operators as potentially available from a given domain state if an affectable obstacle or obstacles (such as affectable objects) blocking the action were removed. Operators may thus also be associated with executable code that recognizes or specifies when the operator could be applied if certain affectable obstacles blocking the action were removed or appropriately dealt with, and executable code that calculates effects that would then result in simulation, and executable code that calculates means for correcting the obstacle. Operators may optionally be further associated with executable code that specifies a method for removing, correcting, solving, or overcoming obstacles to applying the operator. Affectable objects may be associated with executable code that specifies methods for affecting the object, for example by invoking appropriate operators. Goal types or classes may be associated with executable code that embodies methods useful for achieving such a goal. Typically, objects and operators and goals and domains may come in classes that share certain methods implemented in executable code, and any given specific object or action or goal or domain may be an instance of such a class.

In computer science, for example in the Python programming language, the term class may describe a software object that typically is used to represent or model different items of a similar kind and the term method may describe executable code that may be applied to instances of a class.

Many real world domains contain actual structure, such as particular objects and kinds of objects, that behave in characteristic ways. The present invention provides a technique for exploiting the structure of particular domains so as to efficiently solve design problems within them. In order to facilitate this, as described above the user may supply software objects that model, mirror, reflect, or exploit certain aspects of the actual structure of the domain, and that may calculate effects in simulation. Such software objects may be viewed as defining properties of the domain simulation. An object may thus be defined within the program as a particular piece of supplied executable code that may model a physical object or feature or class of objects in the domain. An operator may thus be defined with the program as a particular piece of supplied executable code that may model an action or macro-action that might be available in the domain. An object may be considered affectable if executable code for identifying affectable objects identifies it as such, or alternatively if any available operators effect it or its simulation, which may be the case when actual actions available in the domain may change in some way the modeled physical object or feature. An object may be considered an obstacle to an operator in a state if executable software identifies it as such, which may occur when a real domain object or feature modeled prevents or obstructs applying the real actions modeled in the modeled domain state. An operator may be considered to be applicable if obstacles were removed if executable software for identifying when it would be applicable if obstacles were removed so identifies it, and said software may specify a simulated domain state or changes to a simulated domain state that would result.

One way of thinking about this is using a metaphor in which the domain is represented by a simulation, and code is supplied to model aspects of the world, including contrafactual aspects (such as modeling the effects of actions that would only be applicable if certain obstacles were removed). Exploiting this metaphor, actions and items such as objects within the program may sometimes be described as if the action were occurring in the domain.

Figure 10:
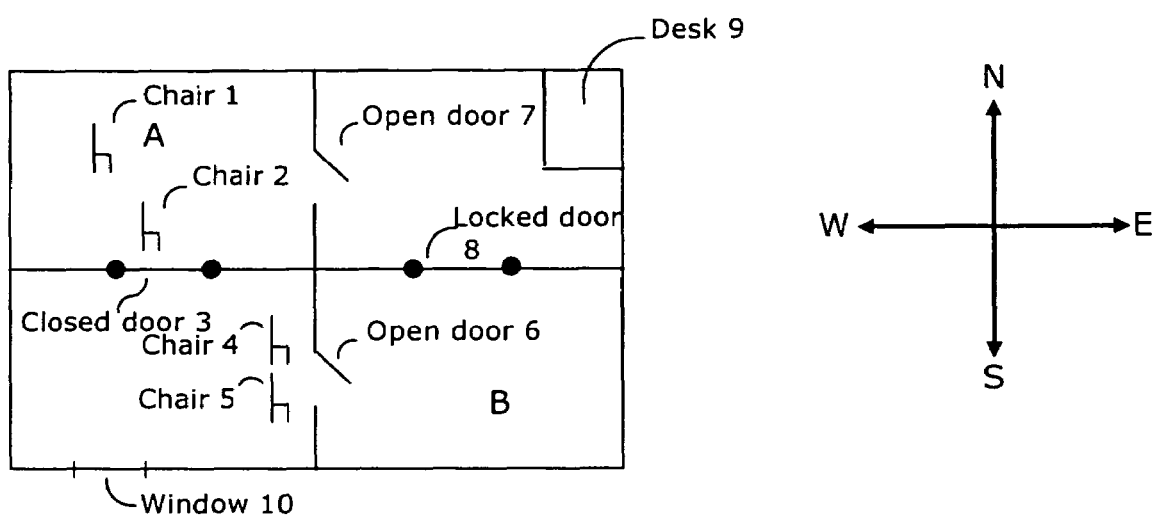
FIG. 10 is a diagram of a domain.

For example, if the domain is navigating around an office building, as shown in FIG. 10, affectable objects may include windows (such as windows 10) and doors that can be opened or closed (such as doors 3, 6, 7, and 8), or furniture (such as chairs 1, 2, 4, and 5) that may be moved, and unaffectable objects may include walls (assuming the conditions of the domain specify that no actions are available that tear down or rebuild walls). An action that might be available from a given domain state is to walk south one meter, which might be currently blocked by an obstacle comprising a closed door but said action might be available if the door were first opened. Such an action might have the effect on a simulation of translating a simulated man one meter south within the simulated office. An obstacle to opening the door might be if it is locked. The program may thus include executable code for simulating walking around the office (including operators such as walk south one meter, walk east one meter), executable code for recognizing when walking south one meter would be feasible if an obstacle were removed and for simulating the location that would be reached. Classes of obstacles might include doors, and executable code might be provided for correcting a locked door, which could invoke a module for searching for a key in proximate desk drawers and using it to unlock the door. The operator for walking might be able to access an executable method for opening doors, or an executable method for searching for keys and unlocking doors and then opening them. A particular locked door might be an instance of the class of locked doors, in which case the same method of searching for a key and using it to open the door might be available for all doors. The planner may be able to solve problems of the form: given a domain simulation representing a particular office building, given any desired location within the office building, automatically find a way of getting to that location or report that it is inaccessible.

The planner may automatically construct plans in two steps, as shown in FIG. 1. First after inputs such as those pertaining to the domain, operator(s), item(s) and/or classes thereof, an initial of the domain, a desired goal(s) and so forth (as hereinbelow more fully described) may be provided by a user(s) or from a memory, an initial list of candidate plans may be automatically constructed (STEP S110) without any additional input(s) from the user(s). These plans may consist of a sequence of subgoals to be achieved, such as subgoals of applying a particular action at that point in the plan. The planner proposes that if this sequence of subgoals can be achieved, it may result in satisfying the design goals. Second (STEP S120 and below) the planner may automatically refine these candidate plans without any further input(s) from the user(s), seeking to generate a concrete or final plan that has been verified in simulation as resulting in a configuration satisfying the design goals.

"Candidate plans" will sometimes for convenience be referred to simply as plans. Candidate plans may contain subgoals of performing operators, wherein the operators may be obstructed inasmuch as the program may identify that they could not be performed at the simulated domain state, which may model the fact that the associated actions would be impossible at the corresponding state of the actual domain, but wherein the program may identify or specify that the actions would be applicable if certain objects were removed or appropriately dealt with. Such objects may be considered obstacles, and the candidate plan may be said to involve them, and it may be considered that the obstacles are changed, fixed, overcome or solved when a refined candidate plan is generated, typically including additional operators inserted for the purpose of dealing with the obstacles, so that the operator may be applied and/or the subgoal realized. If it is recognized that a subgoal can not possibly be resolved unless a particular obstacle is overcome, then it may be considered that the obstacle should be overcome. The automated process of considering candidate plans and modifying them or creating new candidate plans based on them in ways directed toward changing, fixing, overcoming or solving the obstacles may be considered refining the candidate plan.

Figure 2:
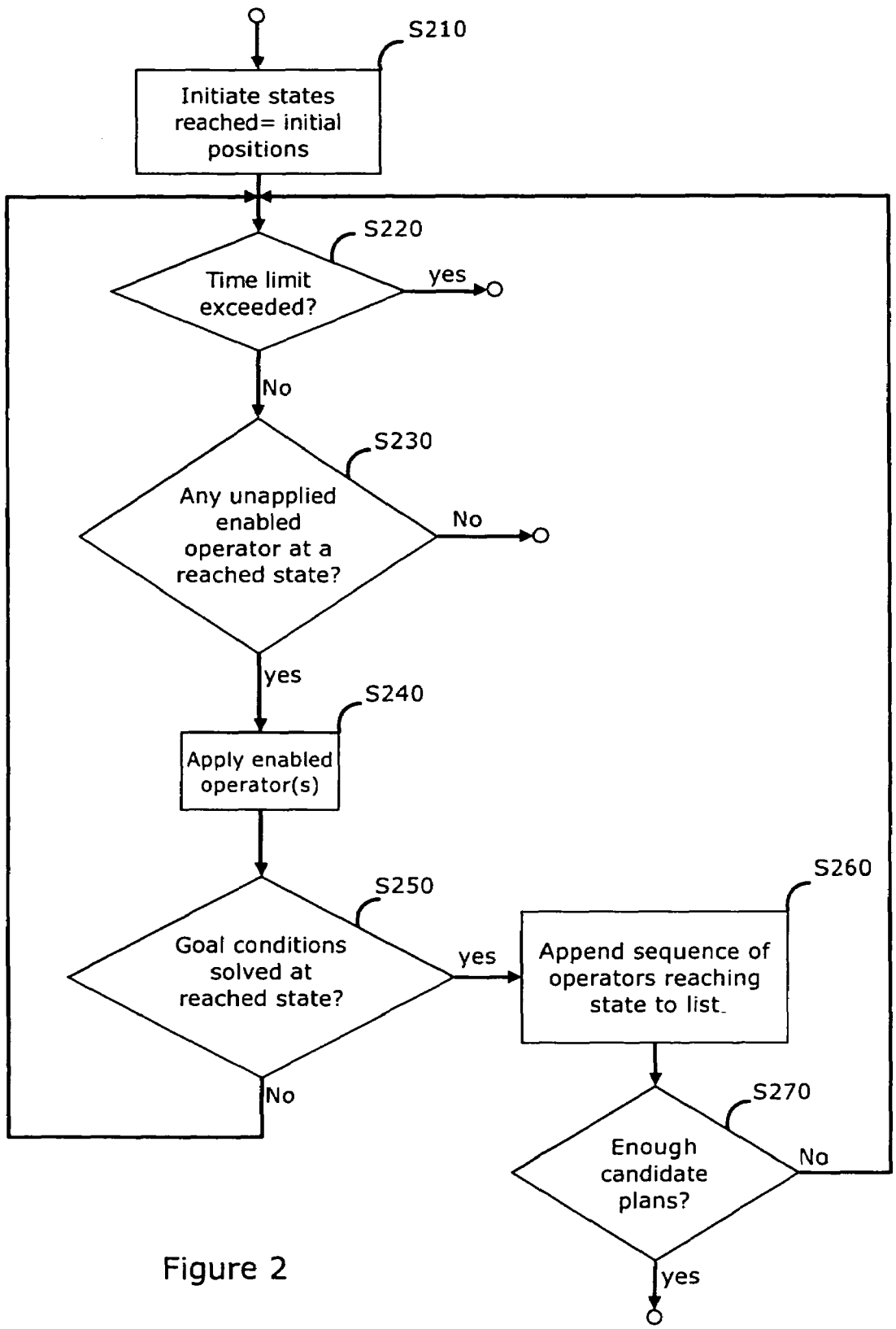
FIG. 2 is a diagram of a flow chart of a method of finding candidate plans.

An embodiment of the present invention for automatically constructing the initial list of candidate plans is shown in FIG. 2. The set of states reached may be initially set to include only the initial state (STEP S210). (FIG. 2 assumes that the initial state does not satisfy the goals, a check could be provided and return success if so.) Then the following process may be iterated. If a time limit has been placed on the computation, it may be checked to see if it has been exceeded (STEP S220). If so, it may be terminated. If no, whether there are enabled operators that have not yet been applied at states that have been reached may be determined at STEP S230. If not, the process terminates. If so, processing may be proceed to STEP S240 wherein the process applies one or more such operators, keeping track of the states reached and the sequences of operators that reached those states from the initial state. Next, whether the goal conditions are satisfied in any new states reached may be determined at STEP S250. If so, processing may proceed to STEP S260 wherein the sequence of operators that reached this state may be added to a list. When the process terminates, this list may be returned as the list of candidate plans. If it is determined that there are enough candidate plans at STEP S270, the program may terminate, otherwise it may loop back to examine the effects of enabled operators at reached states that have not yet been applied.

Action operators may be deemed enabled if they are among a set of action operators supplied to the system as relevant to achieving the goals, and if they can either be directly applied in the position, or if it is recognized or specified, or identified that they could possibly be applied in the state if affectable obstacles were removed or corrected.

This recognition may be made by a method associated with the operator class that recognizes when the operator is potentially applicable and implements in simulation effects that the operator would have if it were applicable and applied.

Note that the action operators considered enabled may differ from the actions that would ordinarily be considered applicable. Action operators may often have prerequisites before they can be used, for example you can't walk through a door unless it is open, and ordinary applications of dynamic programming may typically apply actions that are actually applicable. Included in this step may be some actions that may not be immediately applicable. By doing so, shorter sequences of proposed actions may be found that result in achieving the goal criteria, making the search much more efficient. However, the sequence of proposed actions may not actually be feasible, thus requiring the second step of the planner: automatically refining the proposed plans to see whether the obstacles can in fact be removed, overcome or solved and to propose plans for doing so.

The choice of which enabled operators to apply in step S240 may be made in different ways. One way is to apply all enabled operators, reaching as many new states as possible from the states newly reached at the previous iteration. Alternatively action operators applied in step S240 may be suggested by a domain-specific module as appropriate to the domain and situation, or may be selected at random among enabled operators, or in other ways from among enabled operators.

As an example, consider the office building shown in FIG. 10 and assume that someone wishes to reach location B starting from location A, with actions stepping north south east or west. Starting from location A, there are four (4) enabled operators, that is, movement in a north direction, movement in a east direction, movement in a south direction, and movement in a west direction (even though walking West hits chair (1), since chairs are regarded as affectable objects). Continuing from locations reached, one may apply operators that do not hit walls, and have not already been applied from that location. Eventually one might find one or more candidate paths to location B, even if these paths go through locked doors. The process may return a list of such paths, each path consisting of a sequence of operators. In FIG. 10, the process may return a path going through open door (7) and the locked door (8), as well as a path going through chair (2), the closed door (3), chair (5), and open door (6).

Alternatively, this planner might be further supplied with macro operators that take it to the adjoining room.

Very short plans may be found in this case, and may again be refined as described above when obstacles to the macro action (e.g. the locked door) were dealt with.

The actual "state" defined or utilized with the present invention (such as in the above discussion and in FIG. 2) may be chosen appropriately to the particular domain and goals. In problems such as the office problem, where the goal is to find a path from one location to another location, the state will typically be characterized by a location reached. In problems where the goal is to find a sequence of actions moving a collection of objects to a collection of goal locations (such as a planner to route a fleet of trucks) the state may be characterized by a set of locations (the locations of all trucks). In more general classes of domains, the state may be characterized in other ways.

In some embodiments of the planner, the process shown in FIG. 2 may be applied in a "lazy" fashion. That is, rather than finding all possible candidate plans, the process automatically terminates at step S270 when one has found a number of candidate plans. At this termination step the state of the whole process may be stored, so that as it is decided that additional candidate plans should be examined (for example, because more detailed analysis of the ones previously found shows them to be less promising) a number of additional candidate plans can be generated by simply resuming the process.

After candidate plans have been generated, the candidate plans may be automatically scored according to a predetermined criteria such as the estimated cost it will take to achieve them. The estimated cost may be a provided measure that allows one to sort the plans and examine the best first, according to a measure that is appropriate to the domain and leads to an effective search. In a typical situation, the cost of a plan may be set to be the sum of a cost attributed to the actions in the plan, plus an estimate (preferably a lower bound) on the cost of actions to remove obstacles in the way of the plan. It may be preferred to use a cost measure that increases as the number of obstacles remaining increases, since this will preferentially search short plans. There are many more conceivable long sequences of actions than short ones.

If a cost is employed that measures the length of the plan, sequences of actions longer than shortest successful sequence may be avoided entirely. The cost may also reflect an estimate of the difficulty of dealing with obstacles, or other measures of the desirability and likelihood of success of the plan. Such estimates may be provided by methods associated with the class of a particular obstacle, or with the class of a particular operator blocked by the obstacle.

As shown in FIG. 1, from step S120 and below, the planner may iteratively work on the plan with lowest estimated cost. As first supplied by the method shown in FIG. 2, candidate plans consist of a sequence of subgoals, for example of applying certain actions, but the actions may not be feasible due to obstacles. The planner may automatically refine such a plan by going through it in time order, and expanding the first unresolved element as indicated in step S130. At step S140 a determination is made as to whether such an expansion results in a finished plan that solves the problem. If yes, this is output as indicated in step S150. An example of a finished plan would be a concrete series of actions that in simulation take the domain from the initial state to a state achieving the design goals. Otherwise, if the determination at step S140 is negative, processing may proceed to step S160 to determine if candidate plans remain so that they may be further considered. If no candidate plans remain the planner may report failure as indicated in step S170.

Figure 3:
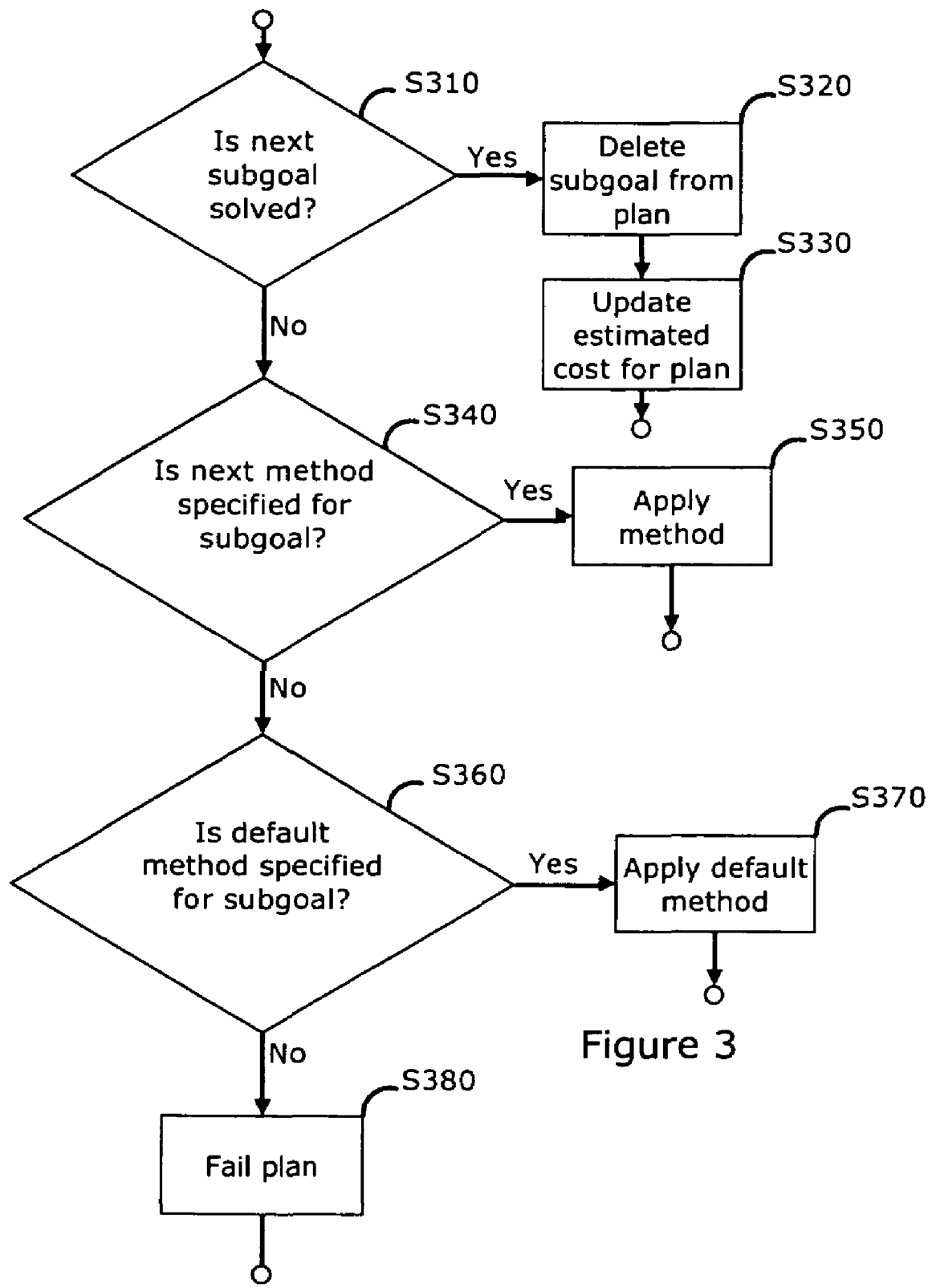
FIG. 3 is a diagram of a flow chart of a method for resolving unresolved subgoals in a candidate plan.

The expansion of an unresolved subgoal (indicated at step S130 in FIG. 1) is further detailed in FIG. 3. Initially, candidate plans may consist of a sequence of subgoals. As these are processed, the candidate plan may consist of an initial sequence of actions that have been found to be applicable in simulation, followed by a remaining sequence of subgoals. A subgoal that has not been resolved into one or more concrete actions achieving it may be considered unresolved. For example, a subgoal of performing an operator which is blocked by obstacles may be considered unresolved, but as the plan is refined further operators may be added that clear the obstacle, and when-a plan is generated in which the operator is no longer blocked by obstacles and may be performed, the subgoal may be considered solved or resolved.

At step S310, a determination is made as to whether the next subgoal is already solved. If the determination is yes, it may be deleted from the plan as indicated in step S320, and the plan's estimated cost may be updated to reflect this as indicated in step S330. For example, if the estimated cost for the plan incorrectly includes an additional cost for solving this subgoal, it may be subtracted out. If the determination at step S310 is negative, that is, if the subgoal is not yet solved, processing may proceed to step S340 whereat the planner may ascertain if a method is specified for achieving the subgoal. For example, if the subgoal is to clear a particular obstacle for a particular kind of action, the action class or the obstacle class may specify a method to clear such obstacles. If it does processing may proceed to step S350 whereat the planner may automatically apply this method. If it does not processing may proceed to step S360, whereat the planner may automatically ascertain whether there is a default method for solving subgoals in this situation or of this type. If there is processing may proceed to step S370, whereat the default method may be automatically applied. If there is no default method, processing may proceed to step S380 then the plan may fail.

Whenever a plan fails, it is removed from consideration, and the planner may automatically back up to consider any remaining candidate plans. If no candidate plans remain, the planner may determine that it is unable to solve the design problem.

Figure 4:
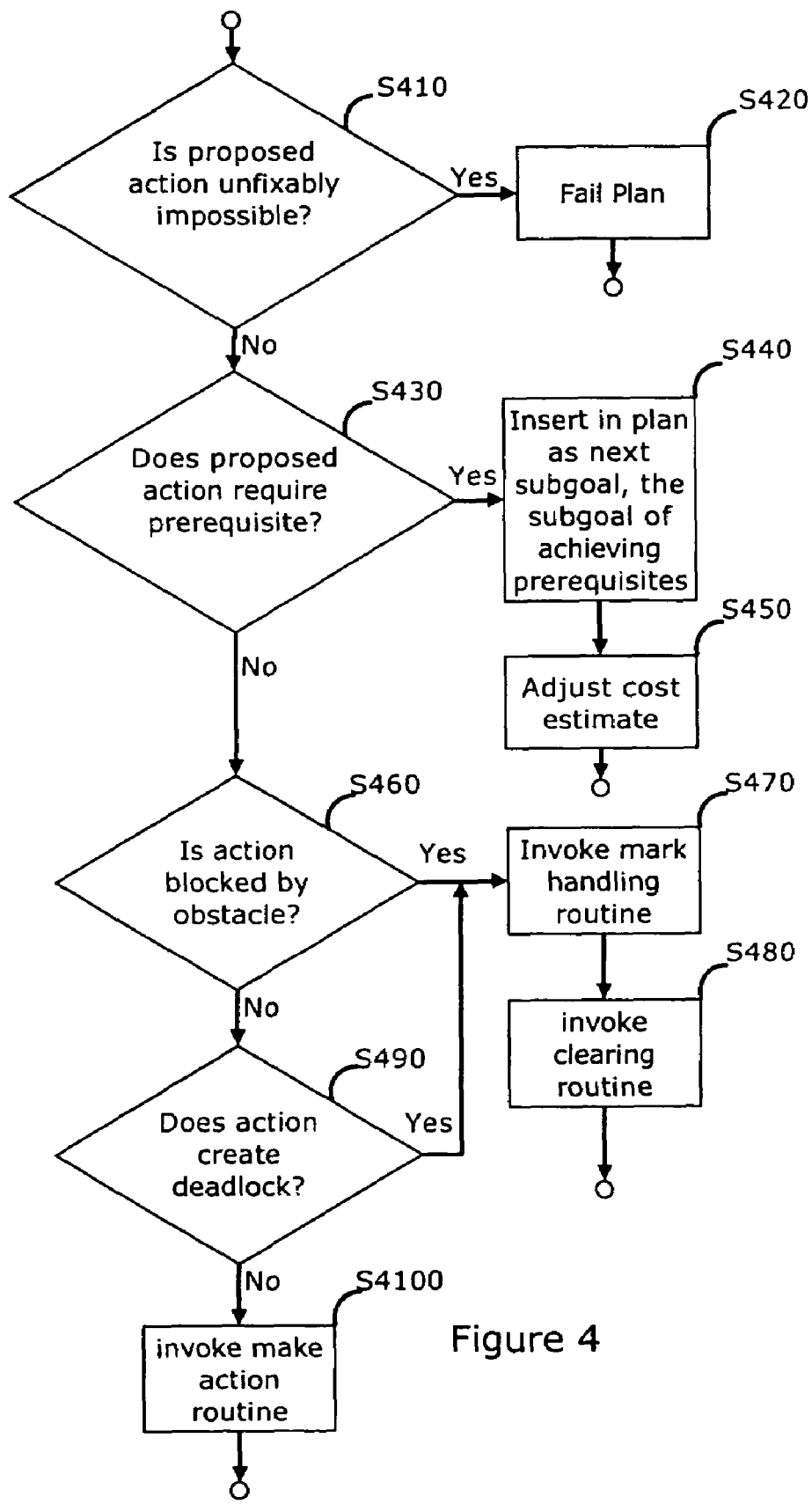
FIG. 4 is a diagram of a flow chart of a default method for processing a subgoal when it specifies an action.

FIG. 4 shows an embodiment of a default method for processing a subgoal when it specifies an action.

First, a determination may be made as to whether the action is impossible in a known unfixable way as indicated at step S410. This may happen in a number of ways. In one way, the action may be recognized as simply impossible. An example might be if the action called for walking through a wall (in a domain in which walls were impermeable and unaffectable). This may be recognized by a method associated with the action, or the obstacle, which recognizes when an action is impossible. In another way, the proposed action may be impossible because it creates a deadlock that could not be avoided by prior moves. This may be recognized by a specific deadlock recognition module. Deadlocks will be further described below. In either of these cases and as indicated at step S420 the plan fails.

If the determination result in step S410 is negative, processing may proceed to step S430 whereat a determination is made as to whether the proposed action requires a prerequisite. If yes, processing may proceed to step S440 whereat in this case the subgoal of achieving the prerequisite(s) is added and the cost estimate for the plan may be updated to reflect the additional subgoal as indicated at step S450.

Whenever a new subgoal is added to a plan, it may be added as the next subgoal, to be treated ahead of whichever subgoal caused it to be added. So for example, when as above the subgoal of achieving prerequisites for an action is added, because the subgoal of performing the action is being considered, said subgoal of achieving prerequisites may be added directly before said subgoal of performing the action, meaning that the prerequisites will be fulfilled before the action is taken.

If the determination result in step S430 is negative, processing may proceed to step S460 whereat a determination may be made as to whether the proposed action is blocked because of some potentially correctable obstacle. If yes, the planner may invoke a routine for handling marking as indicated by step S470 and may then invoke a clearing routine for the obstacle as indicated by step S480.

If the determination in step S460 is negative, that is, if the action is not blocked by an obstacle, processing may proceed to step S490 whereat a determination may be made as to whether implementing the plan will create a deadlock. If yes, the mark handling and clearing routines may be invoked for the deadlock. If not, processing may proceed to step S4100 whereat a make action routine may be invoked.

Figure 5:
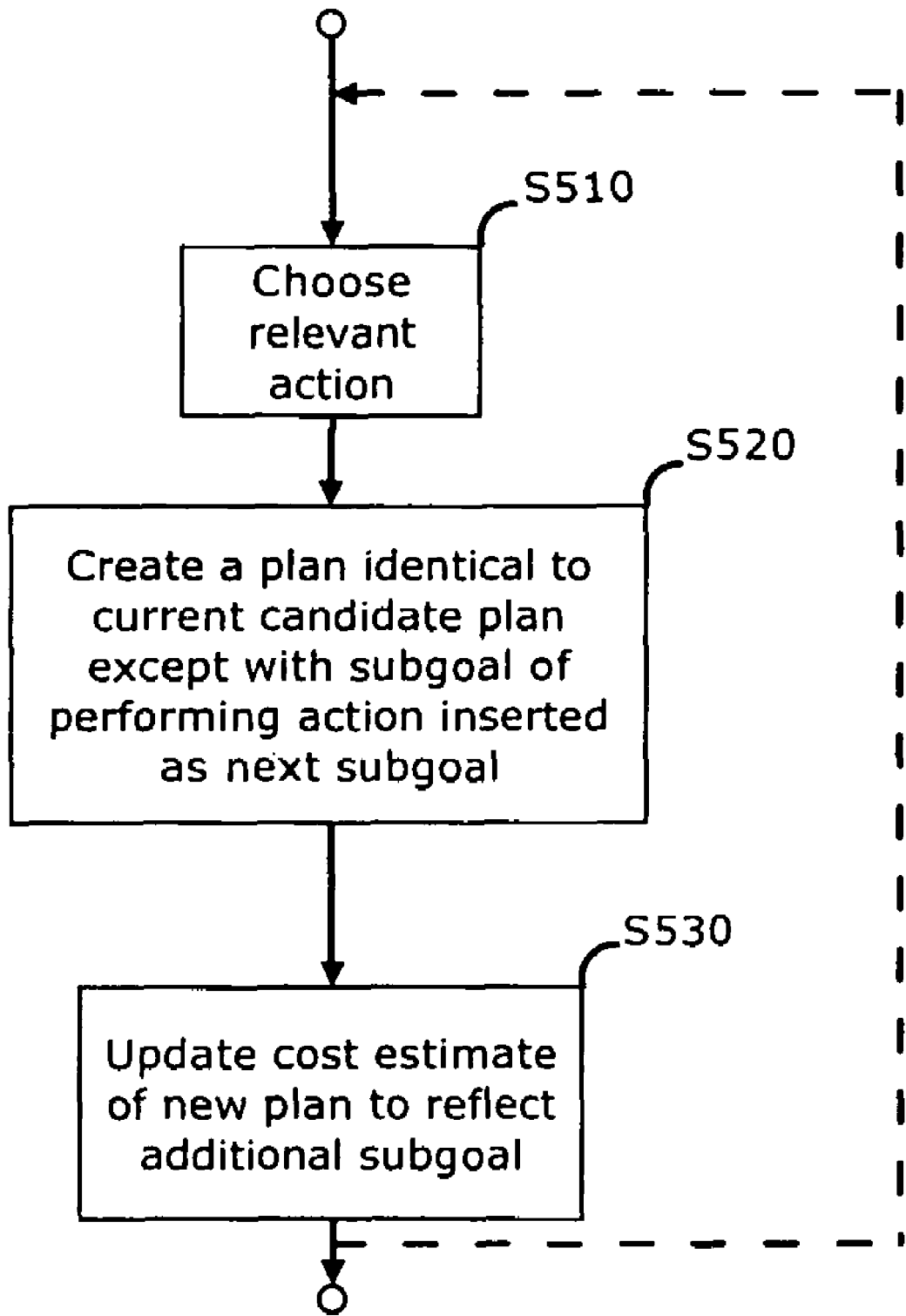
FIG. 5 is a diagram of a flow chart of a routine for clearing obstacles or deadlocks.

FIG. 5 shows an embodiment of a clearing routine (as may be applied in step S480). First as indicated in step S510, a relevant action is chosen. If no specific method is given for finding actions relevant to a particular subgoal (in this case, clearing an obstacle or a deadlock) a default method of defining relevant actions may be that any action affecting the obstacle or deadlock may be considered relevant, if it has not already been tried at this position in processing the plan. Next at step S520 a new plan may be created which may be identical to the current candidate plan, except with the subgoal of performing the chosen relevant action inserted as next subgoal. Next at step S530 a cost estimate may be assigned to this new plan. The cost estimate of the new plan may be the cost estimate of the modified plan plus an estimate of the cost of performing the additional inserted action, unless an estimate of this cost had previously been incorporated.

The clearing routine may be embodied in a non-deterministic way, in which case when invoked it may create a single new candidate plan. In this case, a random relevant previously unapplied action may be chosen in step S510, or the least cost or otherwise most promising remaining relevant action may be chosen. In this case, if it can find no relevant actions in step S510, the clearing routine may simply exit (and the candidate plan that invoked it may fail). Alternatively, the clearing routine may loop (as shown by the dashed line) creating a number of candidate plans, one with each possible relevant action. In this case it will exit when no further relevant actions exist.

Note that the planner may consider all relevant candidate plans (but avoid irrelevant candidate plans), as follows. Say, for example, there is a subgoal of performing an action in a candidate plan that is being processed, and this action is blocked by an obstacle. A clearing routine may be invoked for this obstacle, which may then create a candidate plan with the subgoal of performing an action on the obstacle (to clear it out of the way). Say this action is blocked by another obstacle. Then, when said candidate plan with this subgoal inserted is processed, a clearing routine may be invoked for this second obstacle, which may create a candidate plan that first attempts to move it. Candidate plans may in this way be created so long as the actions added are relevant because of some causal chain or link.

The first subgoal that is not yet resolved may be processed by creating candidate plans with an additional subgoal or subgoals inserted that propose actions relevant to accomplishing the unresolved subgoal. A next action may be relevant if it affects an obstacle preventing the next action in the plan. An obstacle might prevent such an action by simply being in the way (like a door in the example of FIG. 10). Another way an obstacle might be relevant to a next proposed action is by being part of a deadlock created when the action is taken in the current position, as will be discussed below.

The planner may iteratively work on the lowest cost candidate plan, and on the next element of that plan in time sequence until either it finds a plan that achieves the goals, or it runs out of proposed plans. Because it may iteratively work on the lowest estimated cost plan, when it finds a plan it may find a low cost one. Because it may search only actions judged relevant, it may find a plan efficiently and rapidly. Because it may work in time-ordered fashion on the plans, and maintain a simulation of the position the plan has reached to that time, it may judge which actions are possible at any given point, enabling it to avoid considering positions that it does not know how to reach, or actions at such positions that may be impossible.

In the example of FIG. 10, the planner might first process a path through the locked door 8. A method specific to locked doors may suggest looking in the drawers of a proximate desk, such as desk 9, for a key. If no key is found in the desk, this candidate plan may fail. The planner may then process an alternate path through the closed door 3. If it has no specific method for handling chairs, it may invoke a default method, and thus try actions that affect chair (2), such as moving it east. It may then be able to open the closed door. It may then try actions affecting chair (5), such as moving it north. It would find this action blocked by chair (4). It might then amend the plan by first trying an action moving chair (4) west, which would enable it to move chair (5) north. It might alternatively create a plan moving chair (5) south instead of north. Whichever of these plans was considered less costly (depending on details of the embodiment, it would in this case most likely be the latter plan, since it involves less obstacles) may be worked on first. By working on the least estimated cost plan first, the planner may avoid considering many potential plans.

Figure 6:
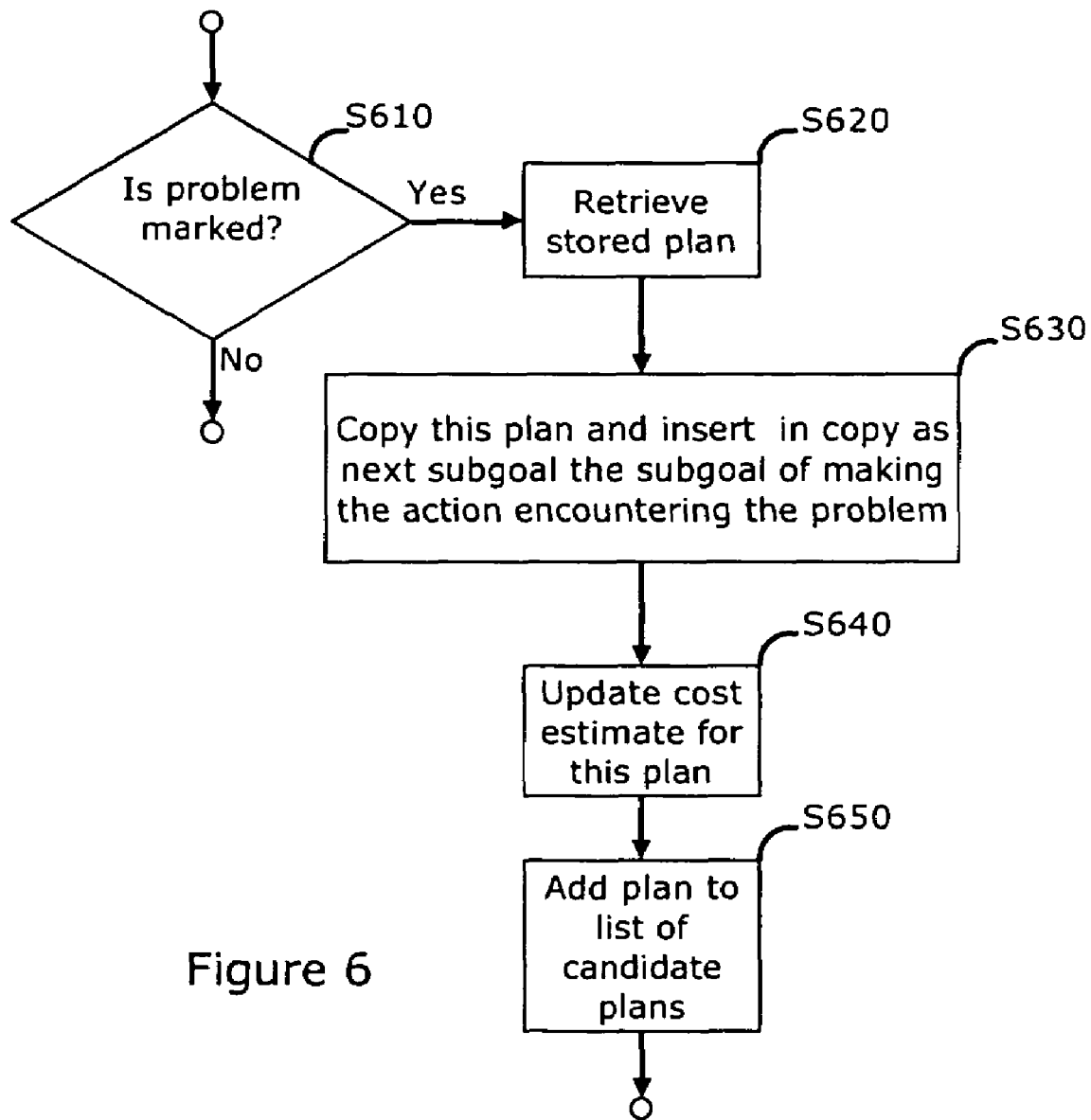
FIG. 6 is a diagram of a flow chart of a mark handling routine.

FIG. 6 shows an embodiment of the mark handling routine invoked in step S470 of FIG. 4. Marking and mark handling is an optional improvement on the planner and may be omitted. If marking is employed, whenever an action is actually made in simulation in a candidate plan (for example by the make action routine invoked in step S4100) the effects of that action may be marked and a copy of the candidate plan as it was just before said action was made saved (as is indicated in step S820, discussed below). For example, an object that is moved by the action may be marked. Then, if marked objects or effects impede a later subgoal, a copy of the saved plan may be retrieved and used to see if it would be possible for a plan to avoid this problem by performing the actions in a different order.

Thus, when an obstacle or deadlock is encountered, a determination may be made as to whether it is marked as indicated at step S610. If it is, the stored copy of the plan that marked the problem may be retrieved as indicated at step S620. A copy of this stored copy may be modified as indicated at step S630 by inserting as next subgoal the subgoal of making the action encountering the problem. Thus this subgoal is inserted before the subgoal of performing the action that marked the obstacle. The cost for this new plan may be updated as indicated by step S640, which may. be the cost estimate of the stored plan plus a cost estimate for the newly added subgoal, and this plan may be added to the set of candidate plans as indicated by step S650.

If the problem was marked by a plurality of previous plans, a new plan may be created and inserted in the plan set by modifying each such stored plan in the same way.

Figure 8:
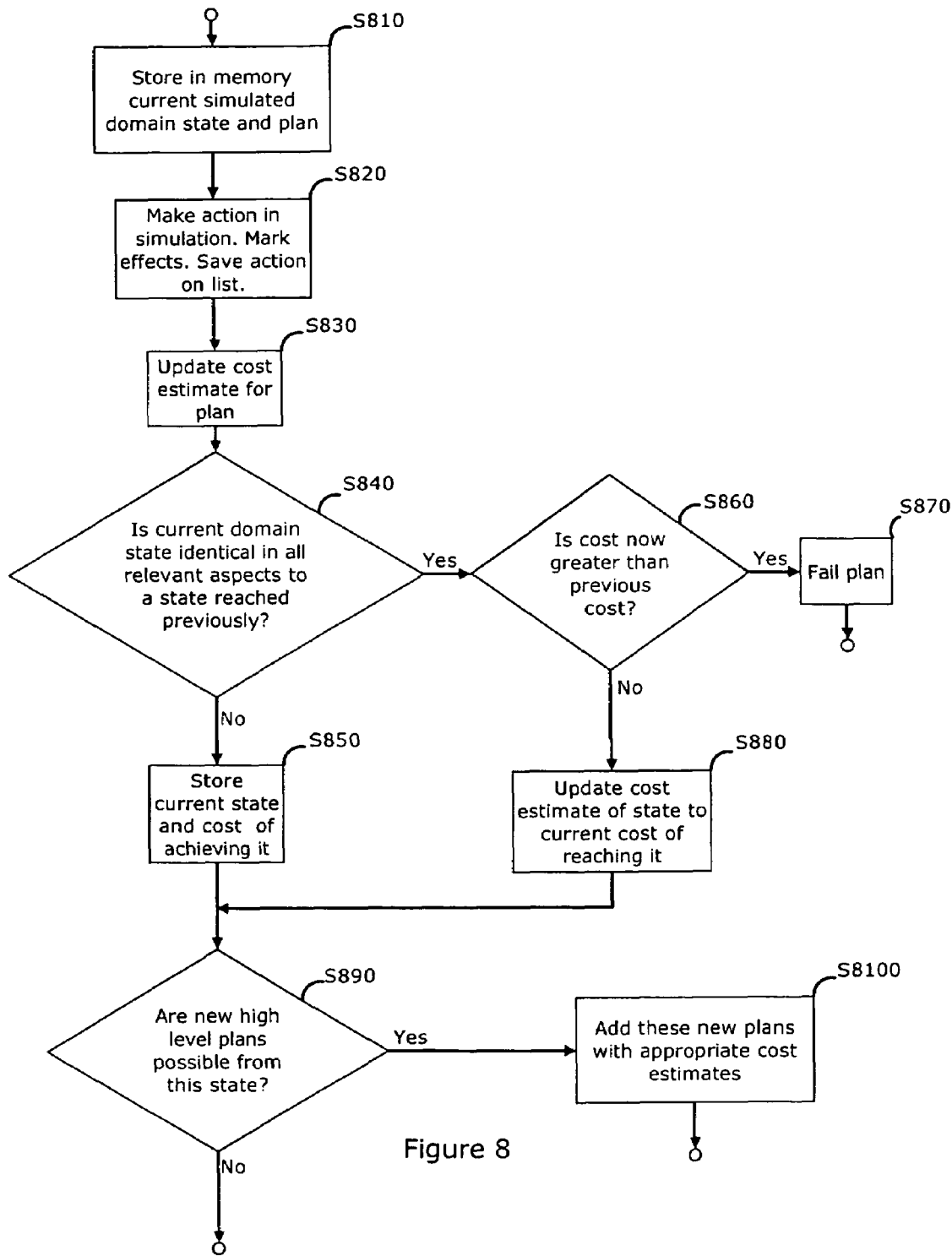
FIG. 8 is a diagram of a flowchart of a make action routine.

FIG. 8 describes an embodiment of the make action routine, invoked in step S4100, the routine employed when a specified action has been found to be makeable without further prerequisite, obstacle removal, or deadlock prevention. The first step, as indicated at step S810, may be to store in memory the current simulated domain state and plan, so that it will be possible to back up later to the point before the action was made. (This step S810 may be omitted if marking is not employed.)

The action may then be made in simulation as indicated at step S820 and effects of the action may be marked by invoking a method associated with the action. The action may also be appended to the list of actions performed by the plan (so that the list can be output in step S170 when a successful plan is generated.) The cost estimate for the plan may then be updated, which may be the actual cost of achieving the present point plus estimate of achieving any remaining subgoals as indicated at step S830. The planner may then check or determine at step S840 as to whether the world situation is now in an identical state in all relevant ways to a state achieved by a previously considered plan.

If so, a determination may be made at step S860 as to whether the cost of getting here was more by this plan. If such determination is yes, this plan may fail as indicated at step S870. If the determination at step S860 is negative, that is if the cost of getting here was less by the previous plan, the cost associated with the stored state may be updated to the new lower cost of reaching it as indicated at step S880. If the determination at step S840 is negative, that is the situation is not identical in all relevant ways to a previously reached state, the world situation may be stored in memory with the cost of achieving this state attached as indicated at step S850 so that the planner can check later plans for duplication of state. Storage and checking may be accomplished efficiently using the method of a hash table. Finally at step S890 the planner may check to see if any new higher level candidate plans are now possible from the reached state. If so, it may add these new candidate plans as indicated at step S8100, with a cost estimate which may be the actual cost of reaching this point plus the estimated cost of remaining subgoals along the new plan. These new plans may be found using, for example, the same approach that may have been used to find the original set of candidate plans, such as that shown in FIG. 2 (but invoked from the current state). These new candidate plans may begin with the initial list of actions that has reached the current simulated domain state, but may have new additional subgoals as they are worked out to reach the final goal.

The planner may be supplied with a deadlock detector that detects local configurations that prevent any possible sequence of actions from achieving the goals. Such configurations may, for example, consist of collections of affectable objects that obstruct each other in such a way that they can not be moved. When the deadlock detector detects a deadlock after a simulated action, it returns the set of affectable objects participating in the deadlock. Plans may then be added that have as next subgoal (ahead of performing said simulated action) being to move these obstacles so that said deadlock will not be encountered when said action is made.

Figure 9:
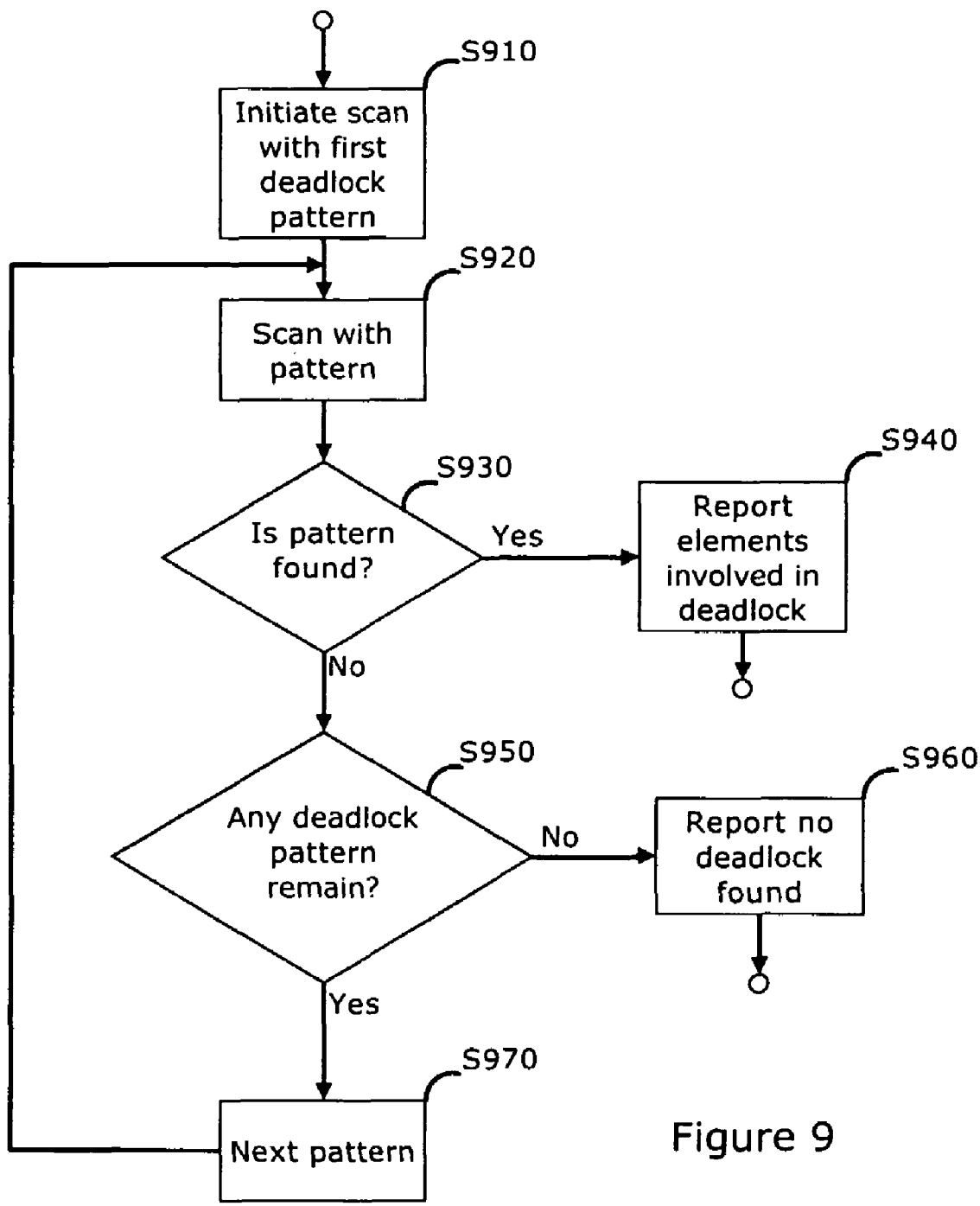
FIG. 9 is a diagram of a flowchart of a deadlock detector.

FIG. 9 is a flowchart of an embodiment of a deadlock detector. The deadlock detector may comprise a number of subroutines or methods capable of recognizing deadlocks. For example, such a method may recognize a particular configuration of objects that implies a deadlock, a state from which goals can not be solved. Such a method may, for example, simply recognize a particular pattern of objects that is known to cause a deadlock. Alternatively, it may do a detailed calculation, sometimes invoking a planning system, that determines a deadlock is present. The deadlock detector may scan the domain simulation in turn looking for each type of deadlock.

In the embodiment of FIG. 9, one loops (from step S920 and below) over one's collection of known deadlock patterns. The scan may be initiated with the first pattern as indicated at step S910. For each pattern a determination may be made at step S930 as to whether the pattern is found in the domain simulation. If so and as indicated at step S940, the elements which comprise the deadlock may be reported and exit. If not, processing may- proceed to step S950 whereat a determination may be made as to whether there is a remaining pattern in one's collection. If yes, processing may be updated to the next pattern as indicated at step S970 and processing may be returned to step S920 to scan with said next pattern; or else when no patterns remain, no pattern found may be reported as indicated at step S960 and exit.

Such subroutines or patterns may be executable code supplied that is appropriate to the domain. Alternatively, the deadlock detector may be constructed using an appropriate module constructor.

U.S. patent application Ser. No. 11/285,937, METHOD and SYSTEM FOR CONSTRUCTING COGNITIVE PROGRAMS, which is incorporated herein by reference, describes a construction of programs using a component called a module constructor that may take as inputs a collection of examples and an objective function, or some other means of supplying a fitness function, and/or a set of instructions, and return a program that approximately optimizes the objective function run on the examples, or finds a sufficiently fit function, or else reports that it failed. As detailed therein, module constructors may be readily embodied using techniques or variants of techniques such as genetic programming, although other techniques may offer advantages in certain cases.

Figure 11:
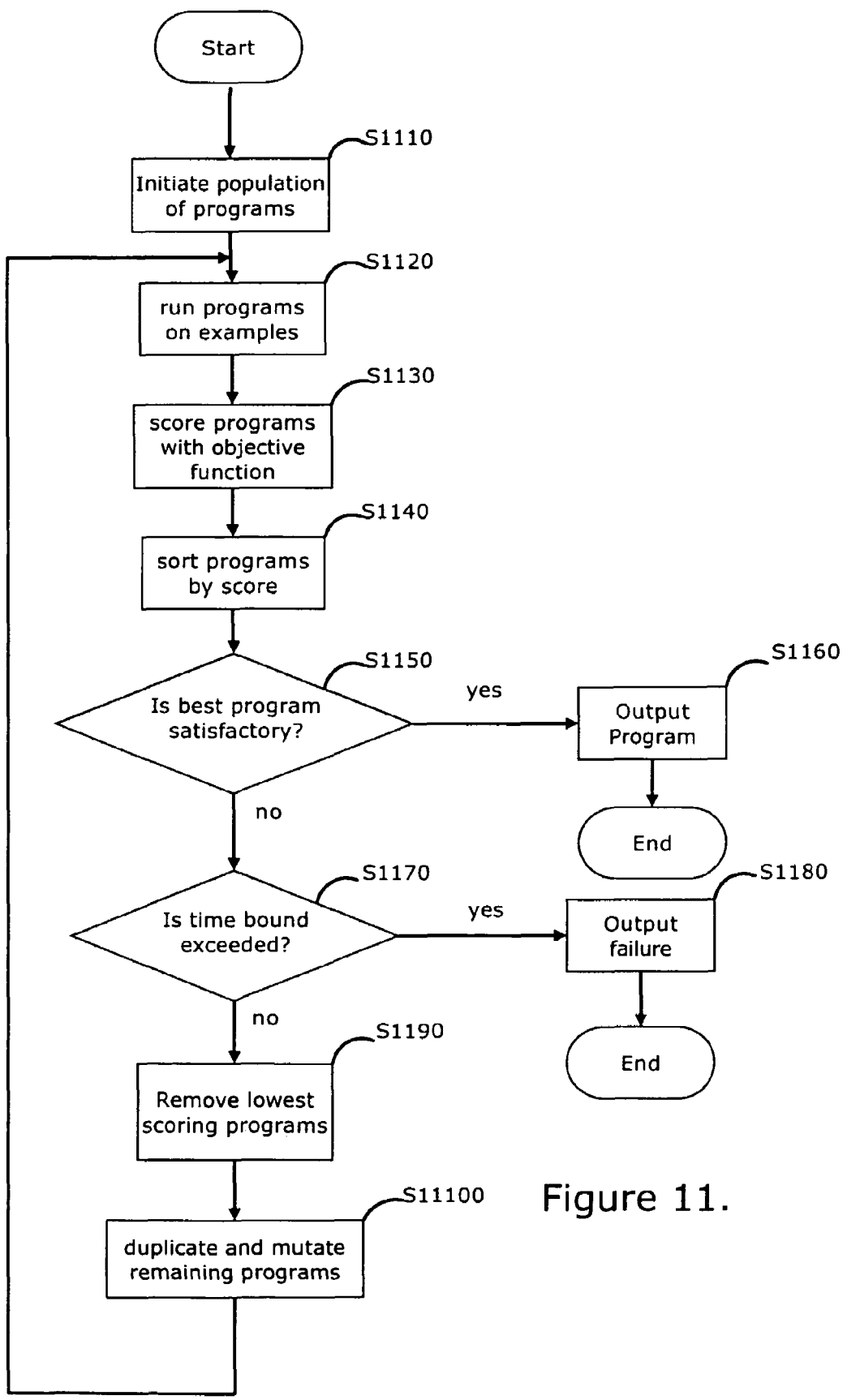
FIG. 11 is a diagram of a flow chart to which reference will be made in explaining a module constructor.

FIG. 11 shows an embodiment of a module constructor.

First at step S1110 a population of programs may be initiated in a randomized way. In one embodiment, a randomized population of programs may be initiated by repeating n times the randomized construction of a program, for an appropriate population size n. One way each randomized construction of a program may be accomplished is as follows. A first instruction may be chosen randomly from the instruction set. If this instruction has no arguments, the construction is done. Otherwise, instructions may be chosen from the instruction set for each of its arguments. These choices are again at random from the instruction set, except that if the instructions are typed, instructions are chosen randomly from among the instructions of appropriate type. This process may be iterated until no instruction in the program has unfilled arguments, and at each step the probability of choosing those instructions in the instruction set that do not have arguments (sometimes known as atoms) is increased, so that the process terminates with programs that are on average of a size deemed appropriate.

Alternatively, the randomized creation of each program in the population may be accomplished by repeating a number of times the random selection of an instruction and stringing the instructions into a list or an appropriate data structure for the particular programming language. In an alternative embodiment, the programmers may enter one or more programs in the population, and the remaining programs in the population may be created as described above.

Proceeding with the discussion of FIG. 11 at step S1120, each program in the population may be run on each of the examples. If a program fails to terminate within a given time bound on any example, it may be deemed to have failed on that example and given a score of 0 for the example. Next at step S1130, each program's performance may be scored on each example according to the objective function and an overall score for each program on the examples may be accumulated. The programs may then be sorted by score at step S1140. In step S1150 a determination may be made as to whether the highest scoring program scores high enough to achieve the satisfaction criteria. If yes, it may be returned as indicated at step S1160 and the module constructor terminates. If the highest scoring program does not satisfy the criteria, processing may proceed to step S1170 whereat a determination may be made as to whether the total time used has exceeded a timeout criteria. If yes, the module constructor may terminate, returning failure as indicated at step S1180. Otherwise, a portion (such as half) of the population of programs scoring lowest may be deleted as indicated at step S1190. Remaining high-scoring programs may be duplicated, and one copy of each duplicate may be mutated randomly in step S11100. One way of mutating a program is to choose at random an instruction from the program, replace it with another randomly chosen instruction (of appropriate type if the language is typed), and grow the program down from there. Alternatively (or in addition) new programs may be formed by applying the crossover operation of genetic programming to two or more programs in the population, and such new programs added to the population. Execution then returns to step S1120.

An alternate embodiment of a module constructor which may be particularly appropriate for constructing deadlock recognition subroutines takes a known set of deadlock positions (for example, supplied by the user) and backs up to find other deadlock positions. This may be appropriate if the action-operators can be simulated in reverse, as is often the case. If one backs up from a deadlock position to find a state such that some action-operator takes that state to the deadlock position, then that state is a candidate deadlock position. It may be promoted to a known deadlock position if all action-operators take it to known deadlocks. The following steps may then be iterated:

start with a collection of known deadlocks,
    create the set of backup states from the deadlocks,
    test the backup states to see which are deadlocks, and
    update the set of known deadlocks.

This may be iterated as many times as convenient to find a collection of deadlock states. These deadlocks may then be embodied in patterns and used to scan for deadlocks within a domain.

Figure 12:
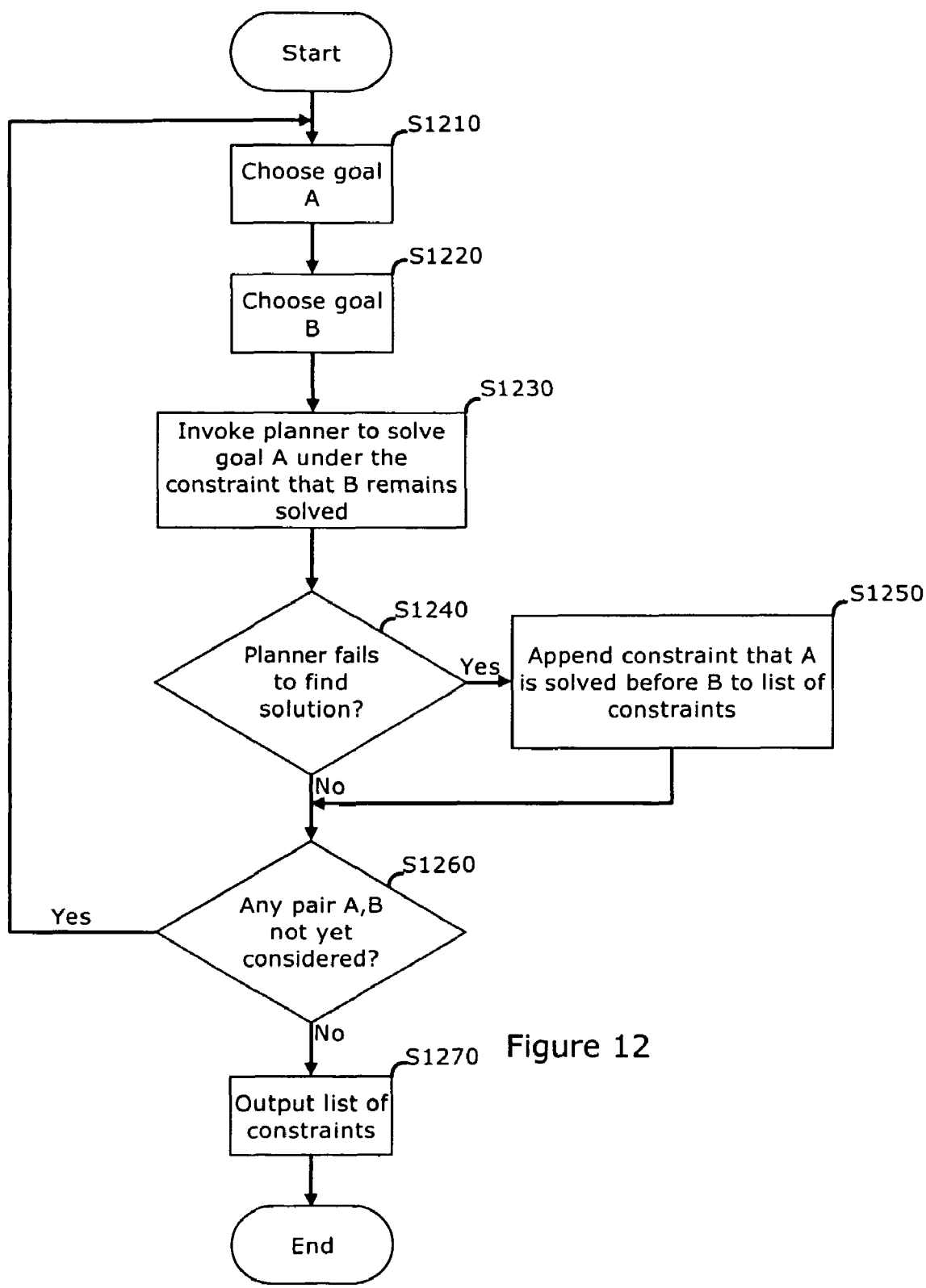
FIG. 12 is a diagram of a flow chart to which reference will be made in explaining an algorithm to find constraints on the order in which goals are solved when there are multiple goals.

For problems where multiple goals must be satisfied simultaneously, computation of a planner may be greatly sped up if it is possible to first assess the order in which the goals should be addressed. It may be, for example, that solving goal A will of necessity destroy a solution of goal B, in which case one should first attempt to achieve goal A, and then to achieve goal B. FIG. 12 illustrates a flowchart for a method to find constraints on the order in which goals are solved when there are multiple goals. The planner may cycle through pairs of goals A (step S1210) and B (step S1220), and for each pair try to solve A given the constraint that B remains solved (step S1230). One may branch on whether this can be done or not (step S1240). If so, then the constraint that A must be solved before B is solved (for the last time) may be added to a list of such constraints (step S1250). Otherwise, at step S1260 a determination may be made as to whether any pairs were not considered. If yes, processing may loop back to consider remaining pairs of goals, and when done, output a list of constraints (step S1270). Such constraints may then be employed by only considering candidate plans to solve the goals in the constrained order.

Other domain specific methods may be supplied for analyzing goal ordering, and used to generate constraints on plans considered.

Figure 7:
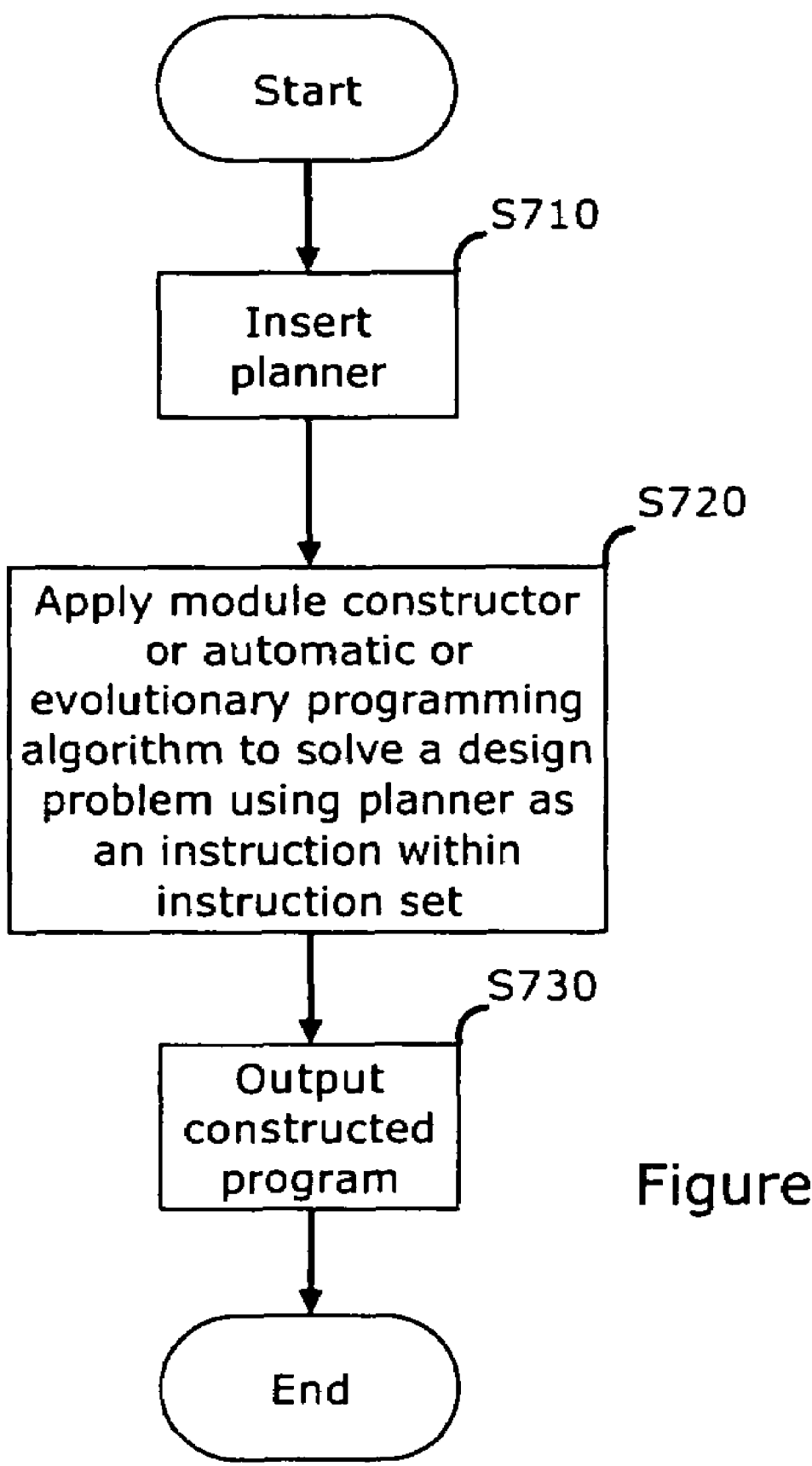
FIG. 7 is a diagram of a flow chart to which reference will be made in explaining how a present method(s) or module(s) embodying such method(s) may be used within a module constructor(s).

FIG. 7 shows a flowchart of how any of the methods disclosed herein, or modules embodying these methods, may be used in an automatic or evolutionary programming algorithm or within module constructors, such as the procedures discussed in U.S. patent application Ser. No. 11/285,937 "Method and System for Constructing Cognitive Programs", incorporated herein by reference. As remarked therein and above with reference to FIG. 11, module constructors (or automatic programming algorithms) may be given a set of instructions and then may construct modules or programs out of the instructions to solve problems or achieve design goals. The planner and/or the methods discussed in this application and/or modules built on top of them may be used within module constructors. This may be done in the following manner. First, a planner may be constructed that solves a class of design goals in a domain using the above mentioned or described methods. This is then a program that may solve a class of problems within a domain. In step S710, this program may be input into a module constructor. The module constructor may then construct at step S720 a program to solve another design problem using this planner as an instruction within the instruction set out of which it constructs the program. Finally at step S730 the constructed program is output.

For example, consider the office domain previously discussed. A program may be written named move (x,y) that uses the methods disclosed herein to calculate how to get from any point x to any point y and that may have a side effect of moving a simulated man to that point. Now move (x,y) may be supplied as an instruction to a module constructor that then constructs a program to solve another class of design goals or to maximize a supplied objective function. For example, if the module constructor diagrammed in FIG. 11 were used, the instruction move (.,.) may be utilized as one of the instructions out of which initial programs are constructed in step S1110 and as an instruction used to replace other instructions in mutation operations in step S11100. In an office domain example, the module constructor may be used to find a program that can arrange furniture in an office in such a way that workers may efficiently move around to rapidly perform some class of supplied tasks. The module constructor may use move (x,y) as well as other instructions and automatically build or evolve a program to solve such problems. The final output program may then be efficiently able, given a simulation of an office, to arrange the furniture in a desirable fashion. Given any office architecture (embodied in a simulation program) it simply uses the architecture within the planner, and uses the planner (as well as the simulation program) within the module it has constructed.

Figure 13:
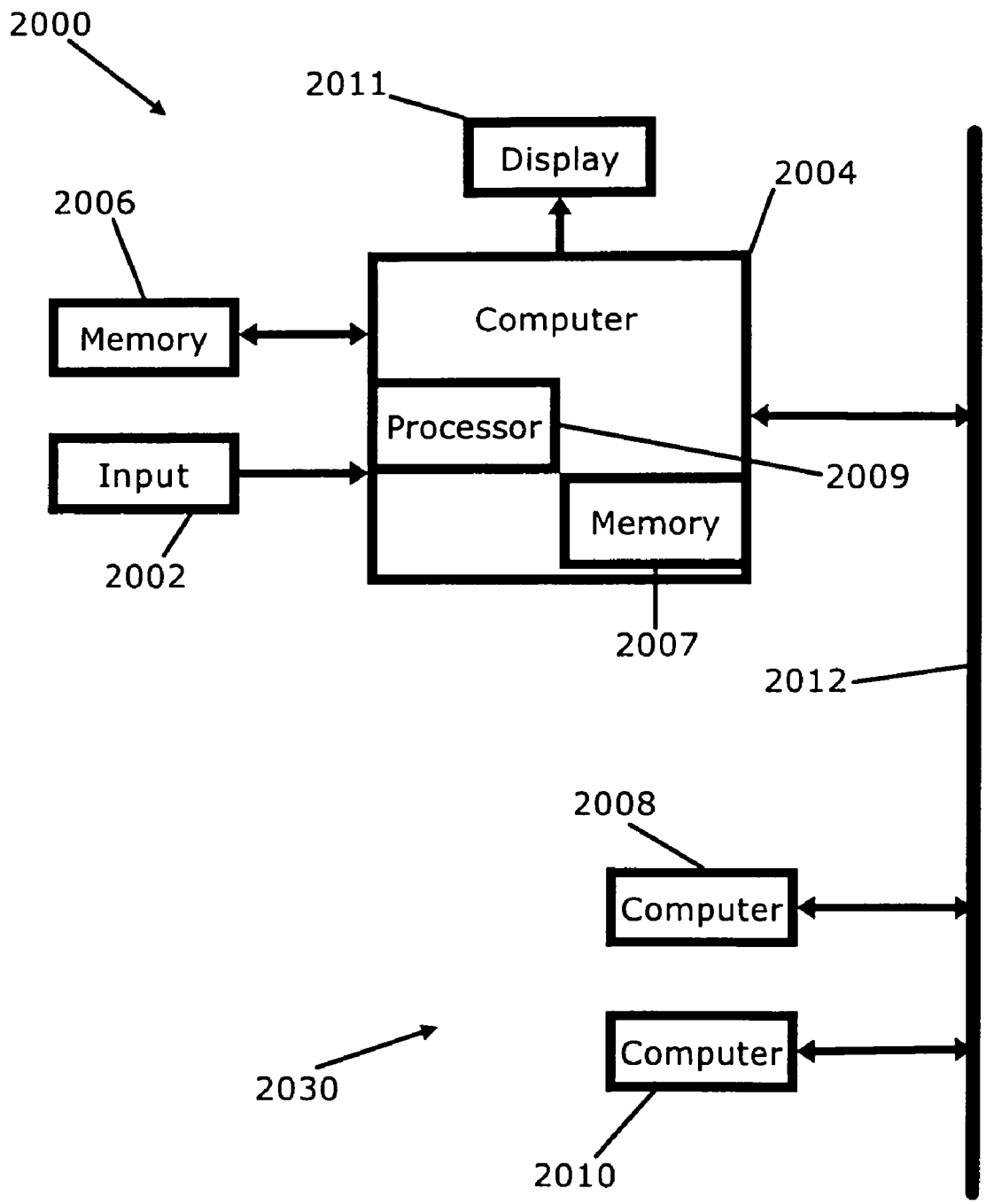
FIG. 13 is a diagram of a system in accordance with an embodiment of the present invention.

FIG. 13 illustrates a system 2000 which may be usable with the above-described programs, planners, modules, scaffolds, instructions, libraries, module constructors, CAD tools, methods, classes and/or other tools. Such system may include an input device 2002, a computer 2004, a memory 2006, and a display unit 2011 which may be coupled together as shown in FIG. 13.

The input device 2002 may enable a user or operator to enter data into the computer 2004. Such input device may be a computer keyboard, a mouse, a writing tablet, or other types of data entry devices. Such user input data may be a number of examples, a number of functions, a number of instructions, a number of satisfaction criteria, and/or a number of simulation environments. The display unit 2011 may enable data to be displayed to the operator.

The computer 2004 may include a memory 2007 and a processor 2009. The memory 2007 may have stored therein programs for use with the present invention. For example, this memory may contain a number of modules, methods, scaffolds, classes, instructions, subprograms, libraries, and so forth which may be used to create the desired program in a manner as previously described. The processor 2009 may be operable to perform and/or control operations used in creating the desired program. Such operations may include receiving and processing user data supplied from the input device 2002, obtaining a number of subprograms in accordance with the received user data, creating the desired program based on the obtained subprogram or subprograms, and/or running the created program to solve the problem. These operations may also include enabling the problem to be divided into a plurality of subproblems. The subprograms may be obtained from programs previously stored in memory or, alternatively, may be obtained from running a stored subprogram or subprograms utilizing the user input data.

The computer 2004 may be operable to receive a portable type memory 2006 such as a disc, semiconductor memory, or the like. Such memory 2006 may be operable to have all or any part of the above-described programs, subprograms, modules, methods, classes and/or scaffolds stored therein.

Furthermore, the computer 2004 may be coupled to a network 2030 by way of a connection such as a bus 2012 or, alternatively, by wireless means. Additionally, such network may be the Internet and may include a number of other computers such as computers 2008, 2010 and so forth. As a result of such arrangement, the computer 2004 may be able to communicate with a number of other computers during its operations and/or may be able to use information from such other computers.

As an example of the operation of the present invention, reference is made to FIGS. 10 and 13. A user may supply information pertaining to a domain by use of input 2002, or a portable memory device 2006. Such information may be stored in memory 2007 and supplied to the processor 2009, or by way of bus 2012 (or wireless communication) to a network 2030 to the processor or processors in the other computers 2008 and 2010. Such information may include simulation programs or simulation modules, item(s), classes of items or objects, classes of operators, classes of domains, methods associated with operators or classes of operators, methods associated with objects or classes of objects, methods associated with a particular domain or a class of domains, methods for clearing particular obstacles or particular classes of obstacles to said operators or classes of operators, methods associated with domains or classes of domains for simulating the effects of operators or classes of operators, methods for recognizing when operators are enabled, methods for simulating the effects of operators, methods for simulating the effects that operators would have if obstacles were removed, methods for specifying states wherein operators might be applicable if affectable obstacles were removed, methods for recognizing when obstacles or objects may be affected by operators and methods for recognizing when obstacles or objects are not affectable by any available operators, methods for recognizing deadlocks, classes of deadlocks, deadlock patterns, classes of goals and methods associated with goal classes, wherein all such methods, classes, modules or programs may be embodied in executable code. With reference to the example of FIG. 10, for example, as previously discussed, supplied operators may include operators stepping a simulated man one meter north, south, east, or west, and methods that specify where said simulated man would be considered to arrive (even if an obstacle such as a closed door required correction before the step would be possible), methods for identifying chairs as moveable objects and for simulating operators moving chairs one meter north, south, east, or west and a method associated with the class of locked doors that searches through drawers on nearby desks for a key, and then tries to unlock the door with keys that are found, and if successful opens the door. Such classes and methods, all of which may be embodied in executable code, may be input into the computer's memory by a user.

The user or other users may subsequently input an initial state for the domain, and a design goal or goals, and the present invention may then by use of the computer 2004, including its processor and memory, automatically return a plan for achieving the design goal or goals without any additional inputs from the user or users. For example, once appropriate methods and modules have been input for office navigation problems, the user may input a map of an office, an initial position, and a goal position, and the program may automatically provide a plan for getting from the initial position to the goal position without any additional input or inputs from the user or users or may report that no such plan is feasible.

The following references and all the references referenced therein are herein incorporated by reference:

Baum, E. B. (2005) Methods and Apparatus for Planning and For Use of Planning in Cognitive Programs, U.S. Appln. No: 60/671,660; Baum, E. B. (2005) U.S. patent application Ser. No. 11/285,937, METHOD AND SYSTEM FOR CONSTRUCTING COGNITIVE PROGRAMS; Baum, E. B.

(2004) "What is Thought?" MIT Press, Cambridge Mass.; Baum, E. B., Durdanovic, I. (2000) "An Artificial Economy of Post Production Systems in Advances in Learning Classifier Systems: Third International Workshop," IWLCS 2000 ed P. L. Lanzi, W. Stoltzmann, and S. M. Wilson 3-21 Berlin: Springer-Verlag; Baum, E. B., Durdanovic, I. (2000) "Evolution of Cooperative Problem Solving in an Artificial Economy," Neural Computation 12 (12):2743-2775;

Andreas Junghanns and Jonathan Schaeffer, Sokoban: Enhancing General Single-Agent Search Methods Using Domain Knowledge, Artificial Intelligence, vol. 129, no. 1-2, pp. 219-251, 2001 and Stuart Russell and Peter Norvig Artificial Intelligence, a Modern Approach, Prentice Hall, Englewood Cliffs N.J. (1995).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A computer implemented method for achieving a desired goal, goals or sub-goals in a simulated domain, in which the simulated domain has a number of operators associated therewith and is related to logistic operations or route navigation in a business, manufacturing or game domain, said method comprising:

receiving information pertaining to the simulated domain, wherein the simulated domain and items in the simulated domain are representations of one or more physical objects or kinds thereof and/or environments in the real world or in a game world;

specifying a number of the items and/or a number of classes of the items in the simulated domain and whether each item and or each class of items is an affectable obstacle or a non-affectable obstacle;

wherein an operator is operable to cause a change to one said affectable obstacle under one or more circumstances and is not operable to cause a change to non-affectable obstacles, wherein the operators are actions that can be performed in the simulated domain, and wherein one or more of the operators are capable of being causally related to one or more other operators in a current simulated domain state, developing one or more candidate plans during a candidate plan development phase by:

determining which of the operators are capable of being applied based on a respective current simulated domain state either directly or by interacting with affectable obstacles, wherein an applicable one or ones of the operators are enabled, and simulating one or more effects due to the one or more enabled operators associated with the simulated domain;

iteratively proceeding towards one or more desired goals by sequentially stepping through numerous simulated domain states; and if a respective desired goal cannot be reached or an affectable obstacle cannot be changed, fixed, solved or overcome from a current simulated domain state, proceeding to a candidate plan refining phase which includes:

returning to one or more previous simulated domain states in order to change, fix, solve, or overcome the affectable obstacle; and modifying one or more current candidate plans or returning to the candidate plan development phase to create one or more new candidate plans;

wherein upon completion of the candidate plan development phase or the candidate plan refining phase a final plan is implemented in a real world environment or in a game environment for achieving the desired goal, goals or sub-goals.

2. The computer implemented method of claim 1, in which during the candidate plan development phase a respective operator is enabled if said respective operator is identified as possibly being applicable in the state if one or more affectable obstacles can be fixed, changed, solved or overcome.

3. The computer implemented method of claim 2, in which the developing of one or more candidate plans during the candidate plan development phase includes applying the one or more enabled operators at previously reached states in the simulated domain until the desired goal, goals or sub-goals are reached.

4. The computer implemented method of claim 1, in which the number of operators includes a first operator and a second operator, and in which the first operator is causally related to the second operator in the current simulated domain state if the first operator affects a respective first affectable obstacle that obstructs performance of the second operator.

5. The computer implemented method of claim 4, in which the candidate plan refining phase further includes inserting a subgoal of performing the second operator to overcome a second affectable obstacle, and if the performance of said second operator is obstructed by the first affectable obstacle, inserting a subgoal of performing the first operator to overcome said first affectable obstacle previous to performing said second operator.

6. The computer implemented method according to claim 1, wherein the candidate plan refining phase further includes applying a pre-specified respective computer program pertaining to a respective kind of object and/or to a respective class of item to fix, solve or overcome a respective obstacle thereof.

7. The computer implemented method according to claim 1, further comprising identifying a collection of objects or obstacles configured in a manner so as to prevent the desired goal or goals from being achieved.

8. The method according to claim 7, wherein the modifying of the candidate plan refining phase includes modifying a respective candidate plan to obtain a modified candidate plan by automatically adding to the respective candidate plan a respective operator or operators that affect one or more of the objects or obstacles in the identified collection of objects or obstacles so that in the modified candidate plan the collection of objects or obstacles does not become configured in the manner to prevent the desired goal or goals from being achieved.

9. The computer implemented method according to claim 1, in which the number of operators includes a first operator and a second operator, and in which said candidate plan refining further includes detecting if a simulated effect or effects of the first operator within a respective candidate plan impede application of the second operator later within the respective candidate plan, and automatically generating a new or a modified candidate plan that applies said second operator before said first operator.

10. The computer implemented method according to claim 1, in which at least two respective goals are desired, and further comprising finding one or more constraints regarding a sequence in which the respective at least two goals are achieved by determining whether one of the at least two respective goals can be solved while another of the at least two respective goals remains solved.

11. A computer implemented method for achieving a desired goal, goals or sub-goals in a simulated domain, in which the simulated domain has a number of operators associated therewith and is related to logistic operations or route navigation in a business, manufacturing or game domain, said method comprising:

receiving information pertaining to the simulated domain, wherein the simulated domain and items in the simulated domain are representations of one or more physical objects or kinds thereof and/or environments in the real world or in a game world;

specifying a number of the items and/or a number of classes of the items in the simulated domain and whether each item and or each class of items is an affectable obstacle or a non-affectable obstacle;

wherein an operator is operable to cause a change to one said affectable obstacle under one or more circumstances and is not operable to cause a change to non-affectable obstacles, wherein the operators are actions that can be performed in the simulated domain, and wherein one or more of the operators are capable of being causally related to one or more other operators in a current simulated domain state, developing one or more candidate plans during a candidate plan development phase by:

determining which of the operators are capable of being applied based on a respective current simulated domain state either directly or by interacting with affectable obstacles, wherein an applicable one or ones of the operators are enabled, and simulating one or more effects due to the one or more enabled operators associated with the simulated domain;

iteratively proceeding towards one or more desired goals by sequentially stepping through numerous simulated domain states;

if a respective desired goal cannot be directly reached without interacting with an affectable obstacle, proceeding to a candidate plan refining phase which includes:

returning to one or more previous simulated domain states in order to change, fix, solve, or overcome an affectable obstacle; and modifying one or more current candidate plans or returning to the candidate plan development phase to create one or more new candidate plans;

wherein upon completion of the candidate plan development phase or the candidate plan refining phase a final plan is implemented in a real world environment or in a game environment for achieving the desired goal, goals or sub-goals.

12. The computer implemented method of claim 11, in which during the candidate plan development phase a respective operator is enabled if said respective operator is identified as possibly being applicable in the state if one or more affectable obstacles can be fixed, changed, solved or overcome.

13. The computer implemented method of claim 12, in which the developing of one or more candidate plans during the candidate plan development phase includes applying the one or more enabled operators at previously reached states in the simulated domain until the desired goal, goals or sub-goals are reached.

14. A computer implemented system for achieving a desired goal, goals or sub-goals in a simulated domain, in which the simulated domain has a number of operators associated therewith and is related to logistic operations or route navigation in a business, manufacturing or game domain, said system comprising:

means for receiving information pertaining to the simulated domain, wherein the simulated domain and items in the simulated domain are representations of one or more physical objects or kinds thereof and/or environments in the real world or in a game world;

means for specifying a number of the items and/or a number of classes of the items in the simulated domain and whether each item and or each class of items is an affectable obstacle or a non-affectable obstacle;

wherein an operator is operable to cause a change to one said affectable obstacle under one or more circumstances and is not operable to cause a change to non-affectable obstacles, wherein the operators are actions that can be performed in the simulated domain, and wherein one or more of the operators are capable of being causally related to one or more other operators in a current simulated domain state, means for developing one or more candidate plans during a candidate plan development phase by:

determining which of the operators are capable of being applied based on a respective current simulated domain state either directly or by interacting with affectable obstacles, wherein an applicable one or ones of the operators are enabled, and simulating one or more effects due to the one or more enabled operators associated with the simulated domain;

means for iteratively proceeding towards one or more desired goals by sequentially stepping through numerous simulated domain states;

means for proceeding to a candidate plan refining phase if a respective desired goal cannot be directly reached without interacting with an affectable obstacle, said means for proceeding involving:

returning to one or more previous simulated domain states in order to change, fix, solve, or overcome an affectable obstacle; and modifying one or more current candidate plans or returning to the candidate plan development phase to create one or more new candidate plans;

wherein upon completion of the candidate plan development phase or the candidate plan refining phase a final plan is implemented in a real world environment or in a game environment for achieving the desired goal, goals or sub-goals.

15. The computer implemented system of claim 14, in which the number of operators includes a first operator and a second operator, and the first operator is causally related to the second operator in the current simulated domain state if the first operator affects a respective first affectable obstacle that obstructs performance of the second operator; and in which said means for proceeding further involves inserting a subgoal of performing the second operator to overcome a second affectable obstacle, and if the performance of said second operator is obstructed by the first affectable obstacle, inserting a subgoal of performing the first operator to overcome said first affectable obstacle previous to performing said second operator.

16. The computer implemented system according to claim 14, in which said means for proceeding further involves applying a pre-specified respective computer program pertaining to a respective kind of object and/or to a respective class of item to fix, solve or overcome a respective obstacle thereof.

17. The computer implemented system according to claim 14, further comprising means for identifying a collection of objects or obstacles configured in a manner so as to prevent the desired goal or goals from being achieved, and in which the modifying of the candidate plan refining phase includes modifying a respective candidate plan to obtain a modified candidate plan by automatically adding to the respective candidate plan a respective operator or operators that affect one or more of the objects or obstacles in the identified collection of objects or obstacles so that in the modified candidate plan the collection of objects or obstacles does not become configured in the manner to prevent the desired goal or goals from being achieved.

18. A computer implemented system for achieving a desired goal, goals or sub-goals in a simulated domain, in which the simulated domain has a number of operators associated therewith and is related to logistic operations or route navigation in a business, manufacturing or game domain, said system comprising:
a device to receive information pertaining to the simulated domain, wherein the simulated domain and items in the simulated domain are representations of one or more physical objects or kinds thereof and/or environments in the real world or in a game world;
a device to specify a number of the items and/or a number of classes of the items in the simulated domain and whether each item and or each class of items is an affectable obstacle or a non-affectable obstacle;
wherein an operator is operable to cause a change to one said affectable obstacle under one or more circumstances and is not operable to cause a change to non-affectable obstacles,
wherein the operators are actions that can be performed in the simulated domain, and
wherein one or more of the operators are capable of being causally related to one or more other operators in a current simulated domain state,
a device to develop one or more candidate plans during a candidate plan development phase by:
determining which of the operators are capable of being applied based on a respective current simulated domain state either directly or by interacting with affectable obstacles, wherein an applicable one or ones of the operators are enabled, and
simulating one or more effects due to the one or more enabled operators associated with the simulated domain;
a device to iteratively proceed towards one or more desired goals by sequentially stepping through numerous simulated domain states;
a device to proceed to a candidate plan refining phase if a respective desired goal cannot be directly reached without interacting with an affectable obstacle, in which proceeding to the candidate plan refining phase by the device to proceed includes:
returning to one or more previous simulated domain states in order to change, fix, solve, or overcome an affectable obstacle; and
modifying one or more current candidate plans or returning to the candidate plan development phase to create one or more new candidate plans;
wherein upon completion of the candidate plan development phase or the candidate plan refining phase a final plan is implemented in a real world environment or in a game environment for achieving the desired goal, goals or sub-goals.

19. The computer implemented system of claim 18, in which the number of operators includes a first operator and a second operator, and the first operator is causally related to the second operator in the current simulated domain state if the first operator affects a respective first affectable obstacle that obstructs performance of the second operator; and in which the proceeding to the candidate plan refining phase by the device to proceed further includes inserting a subgoal of performing the second operator to overcome a second affectable obstacle, and if the performance of said second operator is obstructed by the first affectable obstacle, inserting a subgoal of performing the first operator to overcome said first affectable obstacle previous to performing said second operator.

20. The computer implemented system according to claim 18, in which the proceeding to the candidate plan refining phase by the device to proceed further includes applying a pre-specified respective computer program pertaining to a respective kind of object and/or to a respective class of item to fix, solve or overcome a respective obstacle thereof.

21. The computer implemented system according to claim 18, further comprising means for identifying a collection of objects or obstacles configured in a manner so as to prevent the desired goal or goals from being achieved, and wherein the modifying of the candidate plan refining phase includes modifying a respective candidate plan to obtain a modified candidate plan by automatically adding to the respective candidate plan a respective operator or operators that affect one or more of the objects or obstacles in the identified collection of objects or obstacles so that in the modified candidate plan the collection of objects or obstacles does not become configured in the manner to prevent the desired goal or goals from being achieved.

* * * * *

UNITED STATES PATENT AND TRADEMARK OFFICE
CERTIFICATE OF CORRECTION

PATENT NO. : 7,640,221 B2
APPLICATION NO. : 11/403487
DATED : December 29, 2009
INVENTOR(S) : Eric Baum It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Eighteenth Day of January, 2011

David J. Kappos
*Director of the United States Patent and Trademark Office*